US012175991B2

(12) United States Patent
Büthe et al.

(10) Patent No.: US 12,175,991 B2
(45) Date of Patent: Dec. 24, 2024

(54) AUDIO ENCODER WITH A SIGNAL-DEPENDENT NUMBER AND PRECISION CONTROL, AUDIO DECODER, AND RELATED METHODS AND COMPUTER PROGRAMS

(71) Applicant: Fraunhofer-Gesellschaft zur Förderung der angewandten Forschung e.V., Munich (DE)

(72) Inventors: Jan Büthe, Erlangen (DE); Markus Schnell, Erlangen (DE); Stefan Döhla, Erlangen (DE); Bernhard Grill, Erlangen (DE); Martin Dietz, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 88 days.

(21) Appl. No.: 17/546,540

(22) Filed: Dec. 9, 2021

(65) Prior Publication Data

US 2022/0101866 A1 Mar. 31, 2022

Related U.S. Application Data

(63) Continuation of application No. PCT/EP2020/066088, filed on Jun. 10, 2020, which is (Continued)

(51) Int. Cl.
*G10L 19/02* (2013.01)
*G10L 19/06* (2013.01)
(Continued)

(52) U.S. Cl.
CPC ............ *G10L 19/22* (2013.01); *G10L 19/032* (2013.01)

(58) Field of Classification Search
CPC ....... G10L 19/26; G10L 19/008; G10L 19/02; G10L 19/025; G10L 19/03; G10L 19/06;
(Continued)

(56) References Cited

U.S. PATENT DOCUMENTS

2005/0228651 A1 10/2005 Wang et al.
2007/0124141 A1 5/2007 You
(Continued)

FOREIGN PATENT DOCUMENTS

JP H07273659 A 10/1995
JP 2005004119 A 1/2005
(Continued)

OTHER PUBLICATIONS

Universal Mobile Telecommunications System (UMTS); LTE;"Codec for Enhanced Voice Services (EVS)", Detailed algorithmic description, May 16, 2019, (3GPP TS 26.445 version 12.13.0 Release 12), pp. 1-662 (Year: 2019).*

(Continued)

*Primary Examiner* — Olujimi A Adesanya
(74) *Attorney, Agent, or Firm* — NKL LAW; Jae Youn Kim

(57) ABSTRACT

An audio encoder for encoding audio input data has: a preprocessor for preprocessing the audio input data to obtain audio data to be coded; a coder processor for coding the audio data to be coded; and a controller for controlling the coder processor so that, depending on a first signal characteristic of a first frame of the audio data to be coded, a number of audio data items of the audio data to be coded by the coder processor for the first frame is reduced compared to a second signal characteristic of a second frame, and a first number of information units used for coding the reduced (Continued)

number of audio data items for the first frame is stronger enhanced compared to a second number of information units for the second frame.

29 Claims, 14 Drawing Sheets

Related U.S. Application Data a continuation of application No. PCT/EP2019/065897, filed on Jun. 17, 2019.

(51) Int. Cl.
*G10L 19/22* (2013.01)
*G10L 19/24* (2013.01)
*G10L 19/032* (2013.01)

(58) Field of Classification Search
CPC ......... G10L 19/20; G10L 25/78; G10L 19/08; G10L 19/0204; G10L 19/032; G10L 19/002
See application file for complete search history.

(56) References Cited

U.S. PATENT DOCUMENTS

| | | | | |
|---|---|---|---|---|
| 2009/0099851 | A1* | 4/2009 | Pilati | G10L 19/002 704/500 |
| 2009/0326931 | A1 | 12/2009 | Ragot et al. | |
| 2010/0286991 | A1* | 11/2010 | Hedelin | G10L 19/035 704/500 |
| 2011/0173008 | A1 | 7/2011 | Lecomte et al. | |
| 2012/0185256 | A1 | 7/2012 | Virette et al. | |
| 2012/0253797 | A1* | 10/2012 | Geiger | G10L 19/083 704/219 |
| 2012/0290306 | A1* | 11/2012 | Smyth | G10L 19/002 704/E19.022 |
| 2012/0323582 | A1* | 12/2012 | Peng | G10L 19/025 704/E21.001 |
| 2013/0179175 | A1 | 7/2013 | Biswas et al. | |
| 2014/0142957 | A1 | 5/2014 | Sung et al. | |
| 2014/0200901 | A1 | 7/2014 | Kawashima et al. | |
| 2014/0303965 | A1* | 10/2014 | Lee | G10L 19/002 704/201 |
| 2015/0142452 | A1 | 5/2015 | Sung et al. | |
| 2015/0147354 | A1* | 5/2015 | Epp | A61K 39/092 424/201.1 |
| 2015/0179190 | A1* | 6/2015 | Nagle | G10L 19/06 704/210 |
| 2015/0255076 | A1* | 9/2015 | Fejzo | G10L 19/24 704/500 |
| 2015/0287417 | A1* | 10/2015 | Disch | G10L 19/0212 |
| 2015/0332702 | A1 | 11/2015 | Disch et al. | |
| 2017/0142412 | A1* | 5/2017 | Fuchs | H04N 19/13 |
| 2017/0169833 | A1 | 6/2017 | Lecomte et al. | |
| 2017/0223356 | A1 | 8/2017 | Sung et al. | |
| 2017/0365263 | A1 | 12/2017 | Disch et al. | |
| 2018/0322863 | A1 | 11/2018 | Bocklet et al. | |
| 2019/0156843 | A1 | 5/2019 | Multrus et al. | |
| 2019/0158833 | A1 | 5/2019 | Sung et al. | |
| 2020/0273471 | A1 | 8/2020 | Ravelli et al. | |
| 2020/0273472 | A1 | 8/2020 | Ravelli et al. | |
| 2020/0286494 | A1 | 9/2020 | Ravelli et al. | |

FOREIGN PATENT DOCUMENTS

| | | | | |
|---|---|---|---|---|
| JP | 2019514065 | A | 5/2019 | |
| JP | 2021502606 | A | 1/2021 | |
| KR | 1020160145559 | A | 12/2016 | |
| KR | 10-2017-0037970 | A | 4/2017 | |
| RU | 2583717 | C1 | 5/2016 | |
| RU | 2679571 | C1 | 2/2019 | |
| TW | 201419265 | A | 5/2014 | |
| TW | 201724085 | A | 7/2017 | |
| TW | I602172 | B | 10/2017 | |
| WO | 2010/040503 | A2 | 4/2010 | |
| WO | 2017/066312 | A1 | 4/2017 | |
| WO | 2017/178329 | A1 | 10/2017 | |
| WO | WO-2019091576 | A1 * | 5/2019 | G10L 19/002 |

OTHER PUBLICATIONS

Herre et al, "The Integrated Filterbank Based Scalable MPEG-4 Audio Coder", 1998, In 105th AES Convention, pp. 1-20 (Year: 1998).*

Sugiura et al, "Golomb-rice coding optimized via LPC for frequency domain audio coder", 2014, In2014 IEEE Global Conference on Signal and Information Processing (GlobalSIP) Dec. 3, 2014 (pp. 1024-1028). IEEE. (Year: 2014).*

C Naveen Andrew, "Office Action for IN Application No. 202227002162", dated Nov. 8, 2022, Intellectual Property India, India.

ETSI TS, "Universal Mobile Telecommunications System (UMTS); LTE; Codec for Enhanced Voice Services (EVS); Detailed algorithmic description (3GPP TS 26.445 version 13.4.1 Release 13)", ETSI TS 126 445 V13.4.1 (Apr. 2017), Apr. 6, 2017 (Apr. 6, 2017), pp. 2017-2024, XP055553737.

Martin Dietz et al., "Overview of the EVS codec architecture", 2015 IEEE International Conference on Acoustics, Speech and Signal Processing (I CASSP), Apr. 1, 2015 (Apr. 1, 2015), pp. 5698-5702, XP055290998.

Srikanth Nagisetty et al., "Low bit rate high-quality MDCT audio coding of the 3GPP EVS standard", 2015 IEEE International Conference on Acoustics, Speech and Signal Processing (ICASSP). Apr. 1, 2015 (Apr. 1, 2015), pages, XP055297162.

P. A. Volkov, "Office Action for RU Application No. 2022100599", dated Apr. 26, 2022, Rospatent, Russia.

* cited by examiner (SEPARATED REDUCTION)

(INTEGRATED REDUCTION)

AUDIO ENCODER WITH A SIGNAL-DEPENDENT NUMBER AND PRECISION CONTROL, AUDIO DECODER, AND RELATED METHODS AND COMPUTER PROGRAMS

CROSS-REFERENCE TO RELATED APPLICATIONS

This application is a continuation of copending International Application No. PCT/EP2020/066088, filed Jun. 10, 2020, which is incorporated herein by reference in its entirety, and additionally claims priority from International Application No. PCT/EP2019/065897, filed Jun. 17, 2019, which is also incorporated herein by reference in its entirety.

BACKGROUND OF THE INVENTION

The present invention is related to audio signal processing and, particularly, to audio encoder/decoders applying a signal-dependent number and precision control.

Modern transform based audio coders apply a series of psychoacoustically motivated processings to a spectral representation of an audio segment (a frame) to obtain a residual spectrum. This residual spectrum is quantized and the coefficients are encoded using entropy coding.

In this process, the quantization step-size, which is usually controlled through a global gain, has a direct impact on the bit-consumption of the entropy coder and needs to be selected in such a way that the bit-budget, which is usually limited and often fix, is met. Since the bit consumption of an entropy coder, and in particular an arithmetic coder, is not known exactly prior to encoding, calculating the optimal global gain can only be done in a closed-loop iteration of quantization and encoding. This is, however, not feasible under certain complexity constraints as arithmetic encoding comes with a significant computational complexity.

State of the art coders as can be found in the 3GPP EVS codec therefore usually feature a bit-consumption estimator for deriving a first global gain estimate, which usually operates on the power spectrum of the residual signal. Depending on complexity constraint this may be followed by a rate-loop to refine the first estimate. Using such an estimate alone or in conjunction with a very limited correction capacity reduces complexity but also reduces accuracy leading either to significant under or overestimations of the bit-consumption.

Overestimation of the bit-consumption leads to excess bits after the first encoding stage. State of the art encoders use these to refine the quantization of the encoded coefficients in a second coding stage referred to as residual coding. Residual coding is fundamentally different from the first encoding stage as it works on bit-granularity and thus does not incorporate any entropy coding. Furthermore, residual coding is usually only applied at frequencies with quantized values unequal to zero, leaving dead-zones that are not further improved.

On the other hand, an underestimation of the bit-consumption inevitably leads to partial loss of spectral coefficients, usually the highest frequencies. In state of the art encoders this effect is mitigated by applying noise substitution at the decoder, which is based on the assumption that high frequency content is usually noisy.

In this setup it is evident, that it is desirable to encode as much of the signal as possible in the first encoding step, which uses entropy coding and is therefore more efficient than the residual coding step. Therefore, one would like to select the global gain with a bit estimate as close to the available bit-budget as possible. While the power spectrum based estimator works well for most audio content, it can cause problems for highly tonal signals, where the first stage estimation is mainly based on irrelevant side-lobes of the frequency decomposition of the filter-bank while important components are lost due to underestimation of the bit-consumption.

SUMMARY

According to an embodiment, an audio encoder for encoding audio input data may have: a preprocessor for preprocessing the audio input data to obtain audio data to be coded; a coder processor for coding the audio data to be coded; and a controller for controlling the coder processor so that, depending on a first signal characteristic of a first frame of the audio data to be coded, a number of audio data items of the audio data to be coded by the coder processor for the first frame is reduced compared to a second signal characteristic of a second frame, and a first number of information units used for coding the reduced number of audio data items for the first frame is stronger enhanced compared to a second number of information units for the second frame.

According to another embodiment, a method of encoding audio input data may have the steps of: preprocessing the audio input data to obtain audio data to be coded; coding the audio data to be coded; and controlling the coding so that, depending on a first signal characteristic of a first frame of the audio data to be coded, a number of audio data items of the audio data to be coded for the first frame is reduced compared to a second signal characteristic of a second frame, and a first number of information units used for coding the reduced number of audio data items for the first frame is stronger enhanced compared to a second number of information units for the second frame.

Still another embodiment may have a non-transitory digital storage medium having stored thereon a computer program for performing a method of encoding audio input data having the steps of: preprocessing the audio input data to obtain audio data to be coded; coding the audio data to be coded; and controlling the coding so that, depending on a first signal characteristic of a first frame of the audio data to be coded, a number of audio data items of the audio data to be coded for the first frame is reduced compared to a second signal characteristic of a second frame, and a first number of information units used for coding the reduced number of audio data items for the first frame is stronger enhanced compared to a second number of information units for the second frame, when said computer program is run by a computer.

The present invention is based on the finding that, in order to enhance the efficiency particularly with respect to the bitrate on the one hand and the audio quality on the other hand, a signal-dependent change with respect to the typical situation that is given by psychoacoustic considerations is entailed. Typical psychoacoustic models or psychoacoustic considerations result in a good audio quality at a low bitrate for all signal classes in average, i.e., for all audio signal frames irrespective of their signal characteristic, when an average result is contemplated. However, it has been found that for certain signal classes or for signals having certain signal characteristics such as quite tonal signals, the straightforward psychoacoustic model or the straight forward psychoacoustic control of the encoder only results in sub-optimum outcomes with respect to audio quality (when the bitrate is kept constant), or with respect to bitrate (when the audio quality is kept constant).

Therefore, in order to address this shortcoming of typical psychoacoustic considerations, the present invention provides, in the context of an audio encoder with a preprocessor for preprocessing the audio input data to obtain audio data to be encoded, and a coder processor for coding the audio data to be coded, a controller for controlling the coder processor in such a way that, depending on a certain signal characteristic of a frame, a number of audio data items of the audio data to be coded by the coder processor is reduced compared to typical straightforward results obtained by state of the art psychoacoustic considerations. Furthermore, this reduction of the number of audio data items is done in a signal-dependent way so that, for a frame with a certain first signal characteristic, the number is stronger reduced than for another frame with another signal characteristic that differs from the signal characteristic from the first frame. This reduction in the number of audio data items can be considered to be a reduction in the absolute number or a reduction in the relative number, although this is not decisive. It is, however, a feature that the information units that are "saved" by the intentional reduction of the number of audio data items are not simply lost, but are used for more precisely coding the remaining number of data items, i.e., the data items that have not been eliminated by the intentional reduction of the number of audio data items.

In accordance with the invention, the controller for controlling the coder processor operates in such a way that, depending on the first signal characteristic of a first frame of the audio data to be coded, a number of audio data items of the audio data to be coded by the coder processor for the first frame is reduced compared to a second signal characteristic of a second frame, and, at the same time, a first number of information units used for coding the reduced number of audio data items for the first frame is stronger enhanced compared to a second number of information units for the second frame.

In an embodiment, the reduction is done in such a way that, for more tonal signal frames, a stronger reduction is performed and, at the same time, the number of bits for the individual lines is stronger enhanced compared to a frame that is less tonal, i.e., that is more noisy. Here, the number is not reduced to such a high degree and, correspondingly, the number of information units used for encoding the less tonal audio data items is not increased so much.

The present invention provides a framework where, in a signal dependent way, typically provided psychoacoustic considerations are more or less violated. On the other hand, however, this violation is not treated as in normal encoders, where a violation of psychoacoustic considerations is, for example, done in an emergency situation such as a situation where, in order to maintain a bitrate used, higher frequency portions are set to zero. Instead, in accordance with the present invention, such a violation of normal psychoacoustic considerations is done irrespective of any emergency situation and the "saved" information units are applied to further refine the "surviving" audio data items.

In embodiments, a two-stage coder processor is used that has, as an initial coding stage, for example, an entropy encoder such as an arithmetic encoder, or a variable length encoder such as a Huffman coder. The second coding stage serves as a refinement stage and this second encoder is typically implemented in embodiments as a residual coder or a bit coder operating on a bit-granularity which can, for example, be implemented by adding a certain defined offset in case of a first value of an information unit or subtracting an offset in case of an opposite value of the information unit. In an embodiment, this refinement coder may be implemented as a residual coder adding an offset in case of a first bit value and subtracting an offset in case of a second bit value. In an embodiment, the reduction of the number of audio data items results in a situation that the distribution of the available bits in a typical fixed frame rate scenario is changed in such a way that the initial coding stage receives a lower bit-budget than the refinement coding stage. Up to now, the paradigm was that the initial coding stage was to receive a bit-budget that is as high as possible irrespective of the signal characteristic since it was believed that the initial coding stage such as an arithmetic coding stage has the highest efficiency and, therefore, codes much better than a residual coding stage from an entropy point of view. In accordance with the present invention, however, this paradigm is removed, since it has been found that for certain signals such as, for example, signals with a higher tonality, the efficiency of the entropy coder such as an arithmetic coder is not as high as an efficiency as obtained by a subsequently connected residual coder such as a bit coder. However, while it is true that the entropy coding stage is highly efficient for audio signals in average, the present invention now addresses this issue by not looking on the average but by reducing the bit-budget for the initial coding stage in a signal-dependent way and, advantageously, for tonal signal portions.

In an embodiment, the bit-budget shift from the initial coding stage to the refinement coding stage based on the signal characteristic of the input data is done in such a way that at least two refinement information units are available for at least one, and advantageously 50% and even more advantageously all audio data items that have survived the reduction of the number of data items. Furthermore, it has been found that a particularly efficient procedure for calculating these refinement information units on the encoder-side and applying these refinement information units on the decoder-side is an iterative procedure where, in a certain order such as from a low frequency to a high frequency, the remaining bits from the bit-budget for the refinement coding stage are consumed one after the other. Depending on the number of surviving audio data items and depending on the number of information units for the refinement coding stage, the number of iterations can be significantly greater than two and, it has been found that for strongly tonal signal frames, the number of iterations can be four, five or even higher.

In an embodiment, the determination of a control value by the controller is done in an indirect way, i.e., without an explicit determination of the signal characteristic. To this end, the control value is calculated based on manipulated input data, where this manipulated input data are, for example, the input data to be quantized or amplitude-related data derived from the data to be quantized. Although the control value for the coder processor is determined based on manipulated data, the actual quantization/encoding is performed without this manipulation. In such a way, the signal-dependent procedure is obtained by determining a manipulation value for the manipulation in a signal-dependent way where this manipulation more or less influences the obtained reduction of the number of audio data items, without explicit knowledge of the specific signal characteristic.

In another implementation, the direct mode can be applied, in which a certain signal characteristic is directly estimated and dependent on the result of this signal analysis, a certain reduction of the number of data items is performed in order to obtain a higher precision for the surviving data items.

In a further implementation, a separated procedure can be applied for the purpose of reduction of audio data items. In the separated procedure, a certain number of data items is obtained by means of a quantization controlled by a typically psychoacoustically driven quantizer control and based on the input audio signal, the already quantized audio data items are reduced with respect to their number and, advantageously, this reduction is done by eliminating the smallest audio data items with respect to their amplitude, their energy, or their power. The control for the reduction can, once again, be obtained by a direct/explicit signal characteristic determination or by an indirect or non-explicit signal control.

In a further embodiment, the integrated procedure is applied, in which the variable quantizer is controlled to perform a single quantization but based on manipulated data where, at the same time, the non-manipulated data is quantized. A quantizer control value such as a global gain is calculated using signal-dependent manipulated data while the data without this manipulation is quantized and the result of the quantization is coded using all available information units so that, in the case of a two-stage coding, a typically high amount of information units for the refinement coding stage remains.

Embodiments provide a solution to the problem of quality loss for highly tonal content which is based on a modification of the power spectrum that is used for estimating the bit-consumption of the entropy coder. This modification exists of a signal-adaptive noise-floor adder that keep the estimate for common audio content with a flat residual spectrum practically unchanged while it increases the bit-budget estimate for highly tonal content. The effect of this modification is twofold. Firstly, it causes filter-bank noise and irrelevant side-lobes of harmonic components, which are overlayed by the noise floor, to be quantized to zero. Second, it shifts bits from the first encoding stage to the residual coding stage. While such a shift is not desirable for most signals, it is fully efficient for highly tonal signals since the bits are used to increase the quantization accuracy of harmonic components. This means they are used to code bits with low significance which usually follow a uniform distribution and therefore are fully efficiently encoded with a binary representation. Furthermore, the procedure is computationally inexpensive making it a very effective tool for solving the aforementioned problem.

BRIEF DESCRIPTION OF THE DRAWINGS

Embodiments of the present invention are subsequently disclosed with respect to the accompanying drawings, in which.

DETAILED DESCRIPTION OF THE INVENTION

Figure 1:
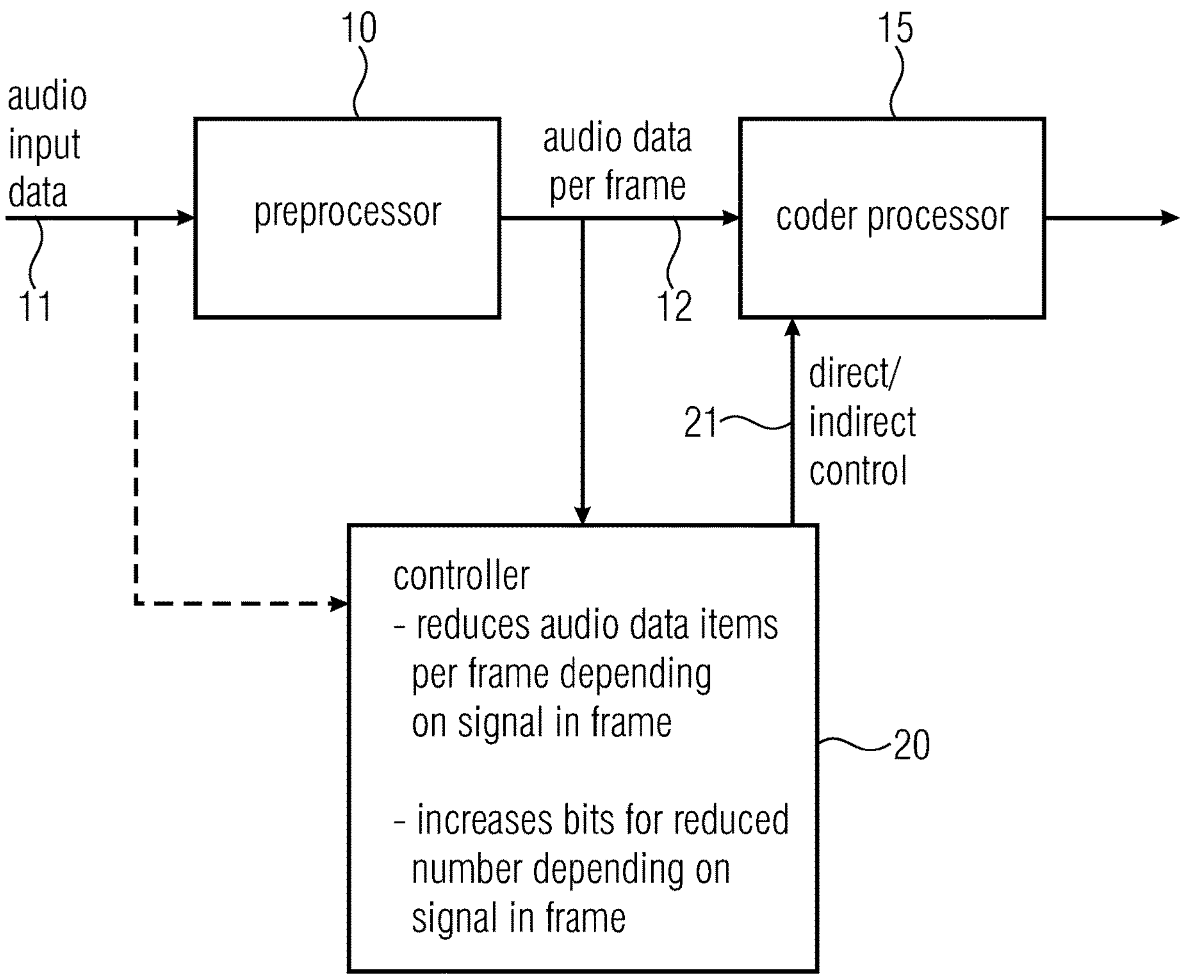
FIG. 1 is an embodiment of an audio encoder.

FIG. 1 illustrates an audio encoder for encoding audio input data 11. The audio encoder comprises a preprocessor 10, a coder processor 15 and a controller 20. The preprocessor 10 preprocesses the audio input data 11 in order to obtain audio data per frame or audio data to be coded illustrated at item 12. The audio data to be coded are input into the coder processor 15 for coding the audio data to be coded, and the coder processor outputs encoded audio data. The controller 20 is connected, with respect to its input, to the audio data per frame of the preprocessor but, alternatively, the controller can also be connected to receive the audio input data without any preprocessing. The controller is configured to reduce the number of audio data items per frame depending on the signal in the frame and, at the same time, the controller increases a number of information units or, advantageously, bits for the reduced number of audio data items depending on the signal in the frame. The controller is configured for controlling the coder processor 15 so that, depending on the first signal characteristic of a first frame of the audio data to be coded, a number of audio data items of the audio data to be coded by the coder processor for the first frame is reduced compared to a second signal characteristic of a second frame, and a number of information unit used for coding the reduced number of audio data items for the first frame is stronger enhanced compared to a second number of information units for the second frame.

Figure 2:
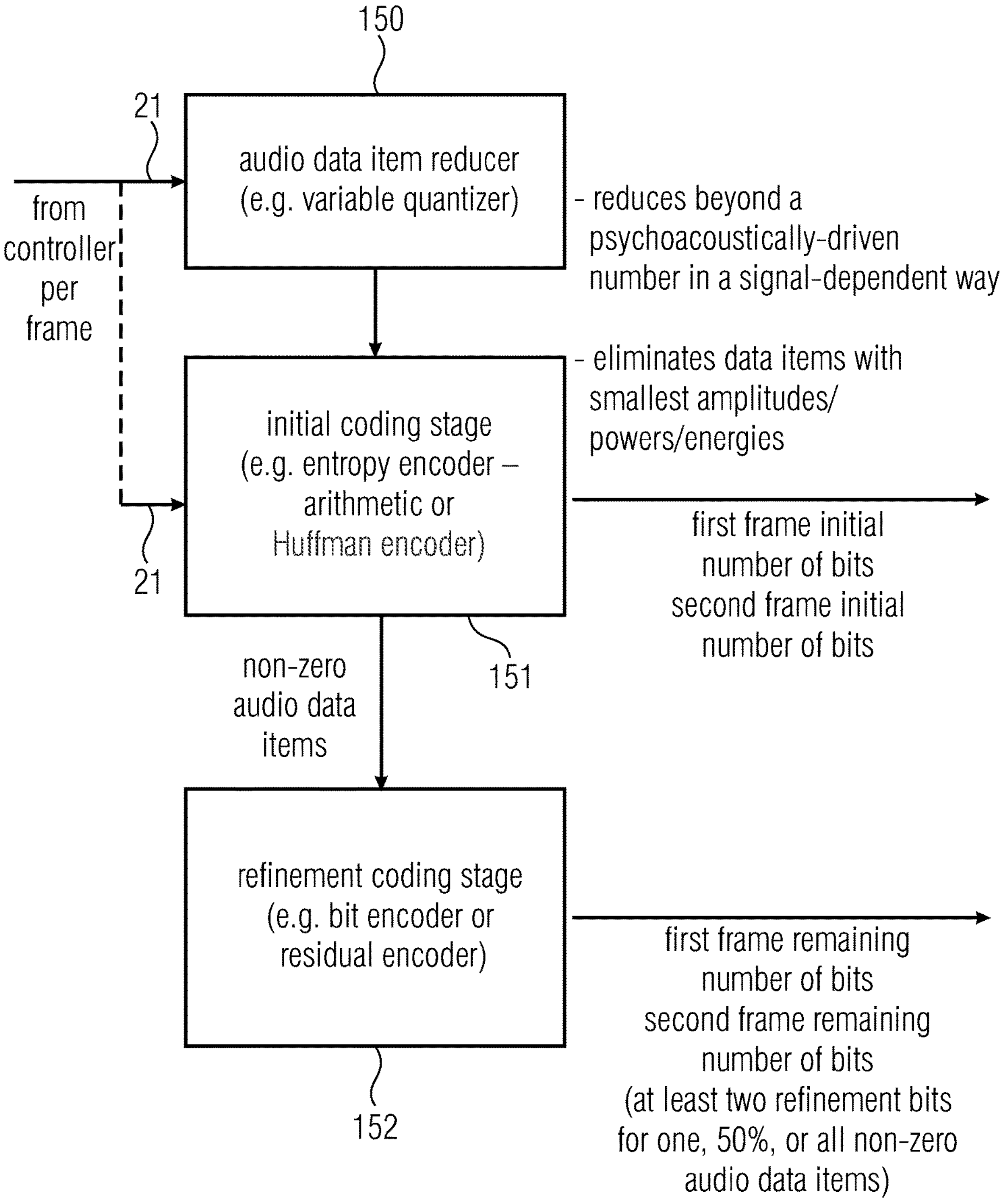
FIG. 2 illustrates an implementation of the coder processor of FIG. 1.

FIG. 2 illustrates an implementation of the coder processor. The coder processor comprises an initial coding stage 151 and a refinement coding stage 152. In an implementation, the initial coding stage comprises an entropy encoder such an arithmetic or a Huffman encoder. In another embodiment, the refinement coding stage 152 comprises a bit encoder or a residual encoder operating on a bit or information unit granularity. Furthermore, the functionality with respect to the reduction of the number of audio data items is embodied in FIG. 2 by the audio data item reducer 150 that can, for example, be implemented as a variable quantizer in the integrated reduction mode illustrated in FIG. 13 or, alternatively, as a separate element operating on already quantized audio data items as illustrated in the separated reduction mode 902 and, in a further non-illustrated embodiment, the audio data item reducer can also operate on non-quantized elements by setting to zero such non-quantized elements or by weighting the to be eliminated data items with a certain weighting number so that such audio data items are quantized to zero and are, therefore, eliminated in a subsequently connected quantizer. The audio data item reducer 150 of FIG. 2 may operate on non-quantized or quantized data elements in a separated reduction procedure or may be implemented by a variable quantizer specifically controlled by a signal-dependent control value as illustrated in the FIG. 13 integrated reduction mode.

The controller 20 of FIG. 1 is configured to reduce the number of audio data items encoded by the initial coding stage 151 for the first frame, and the initial coding stage 151 is configured to code the reduced number of audio data items for the first frame using a first frame initial number of information units, and the calculated bits/units of the initial number of information units are output by block 151 as illustrated in FIG. 2, item 151.

Furthermore, the refinement coding stage 152 is configured to use a first frame remaining number of information units for a refinement coding for the reduced number of audio data items for the first frame, and the first frame initial number of information units added to the first frame remaining number of information units result in a predetermined number of information units for the first frame. Particularly, the refinement coding stage 152 outputs the first frame remaining number of bits and the second frame remaining number of bits and there do exist at least two refinement bits for at least one or advantageously at least 50% or even more advantageously all non-zero audio data items, i.e., the audio data items that survive the reduction of audio data items and that are initially coded by the initial coding stage 151.

Advantageously, the predetermined number of information units for the first frame is equal to the predetermined number of information units for the second frame or quite close to the predetermined number of information units for the second frame so that a constant or substantially constant bitrate operation for the audio encoder is obtained.

As illustrated in FIG. 2, the audio data item reducer 150 reduces audio data items beyond the psychoacoustically driven number in a signal-dependent way. Thus, for a first signal characteristic, the number is reduced only slightly over the psychoacoustically driven number and in a frame with a second signal characteristic, for example, the number is strongly reduced beyond a psychoacoustically driven number. And, advantageously, the audio data item reducer eliminates data items with the smallest amplitudes/powers/energies, and this operation may be performed via an indirect selection obtained in the integrated mode, where the reduction of audio data items takes place by quantizing to zero certain audio data items. In an embodiment, the initial coding stage only encodes audio data items that have not been quantized to zero and the refinement coding stage 152 only refines the audio data items already processed by the initial coding stage, i.e., the audio data items that have not been quantized to zero by the audio data item reducer 150 of FIG. 2.

In an embodiment, the refinement coding stage is configured to iteratively assign the first frame remaining number of information units to the reduced number of audio data items of the first frame in at least two sequentially performed iterations. Particularly, the values of the assigned information units for the at least two sequentially performed iterations are calculated and the calculated values of the information unit for the at least two sequentially performed iterations are introduced into the encoded output frame in a predetermined order. Particularly, the refinement coding stage is configured to sequentially assign an information unit for each audio data item of the reduced number of audio data items for the first frame in an order from a low frequency information for the audio data item to a high frequency information for the audio data item in the first iteration. Particularly, the audio data items may be individual spectral values obtained by a time/spectral conversion. Alternatively, the audio data items can be tuples of two or more spectral lines typically being adjacent to each other in the spectrum. The, the calculation of the bit values takes place from a certain starting value with a low frequency information to a certain end value with the highest frequency information and, in a further iteration, the same procedure is performed, i.e., once again the processing from low spectral information values/tuples to high spectrum information values/tuples. Particularly, the refinement coding stage 152 is configured to check, whether a number of already assigned information units is lower than a predetermined number of information units for the first frame less than the first frame initial number of information units and the refinement coding stage is also configured to stop the second iteration in case of a negative check result, or in case of a positive check result, to perform a number of further iterations, until a negative check result is obtained, where the number of further iterations is 1, 2 . . . . Advantageously, the maximum number of iterations is bounded by a two-digit number such as a value between 10 and 30 and advantageously 20 iterations. In an alternative embodiment, a check for a maximal number of iterations can be omitted, if the non-zero spectral lines were counted first and the number of residual bits were adjusted accordingly for each iteration or for the whole procedure. Hence, when there are for example 20 surviving spectral tuples and 50 residual bits, one can, without any check during the procedure in the encoder or the decoder determine that the number of iterations is three and in the third iteration, a refinement bit is to be calculated or is available in the bitstream for the first ten spectral lines/tuples. Thus, this alternative does not require a check during the iteration processing, since the information on the number of non-zero or surviving audio items is known subsequent to the processing of the initial stage in the encoder or the decoder.

Figure 3:
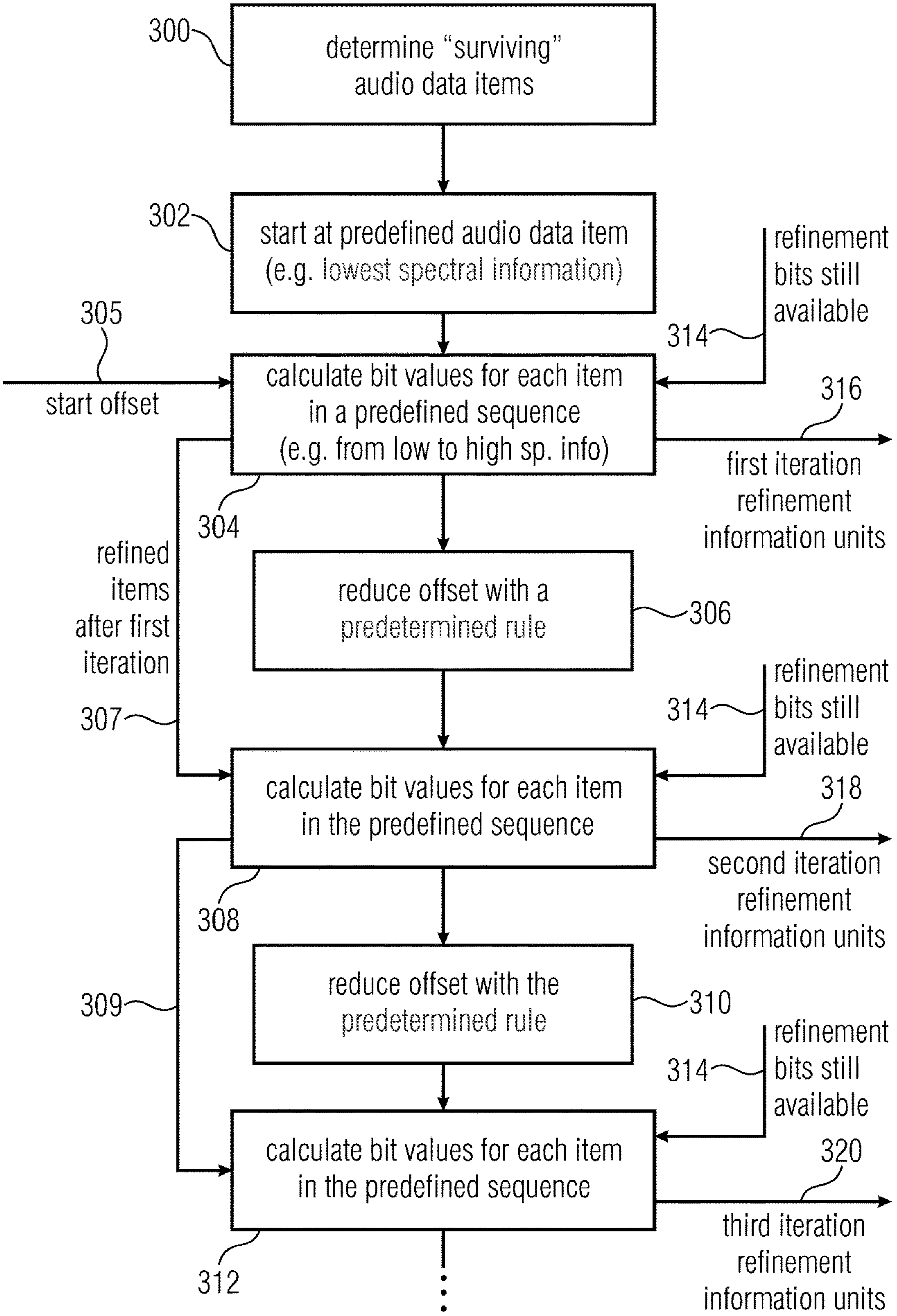
FIG. 3 illustrates an implementation of a refinement coding stage.

FIG. 3 illustrates an implementation of the iterative procedure performed by the refinement coding stage 152 of FIG. 2 that is made possible due to the fact that, in contrast to other procedures, the number of refinement bits for a frame has been significantly increased for certain frames due to the corresponding reduction of audio data items for such certain frames.

In step 300, surviving audio data items are determined. This determination can be automatically performed by operating on the audio data items that have already been processed by the initial coding stage 151 of FIG. 2. In step 302, the start of the procedure is done at a predefined audio data item such as the audio data item with the lowest spectral information. In step 304, bit values for each audio data item in a predefined sequence are calculated, where this predefined sequence is, for example, the sequence from low spectral values/tuples to high spectral values/tuples. The calculation in step 304 is done using a start offset 305 and under control 314 that refinement bits are still available. At item 316, the first iteration refinement information units are output, i.e., a bit pattern indicating one bit for each surviving audio data item where the bit indicates, whether an offset, i.e., the start offset 305 is to be added or is to be subtracted or, alternatively, the start offset is to be added or not to be added.

In step 306, the offset is reduced with a predetermined rule. This predetermine rule may, for example, be that the offset is halved, i.e., that the new offset is half the original offset. However, other offset reduction rules can be applied as well that are different from the 0.5 weighting.

In step 308, the bit values for each item in the predefined sequence are again calculated, but now in the second iteration. As an input into the second iteration, the refined items after the first iteration illustrated at 307 are input. Thus, for the calculation in step 314, the refinement represented by the first iteration refinement information units is already applied and under the prerequisite that refinement bits are still available as indicated in step 314, the second iteration refinement information units are calculated and output at 318.

In step 310, the offset is again reduced with a predetermined rule to be ready for the third iteration and the third iteration once again relies on the refined items after the second iteration illustrated at 309 and again under the prerequisite that the refinement bits are still available as indicated at 314, the third iteration refinement information units are calculated and output at 320.

Figure 4A:
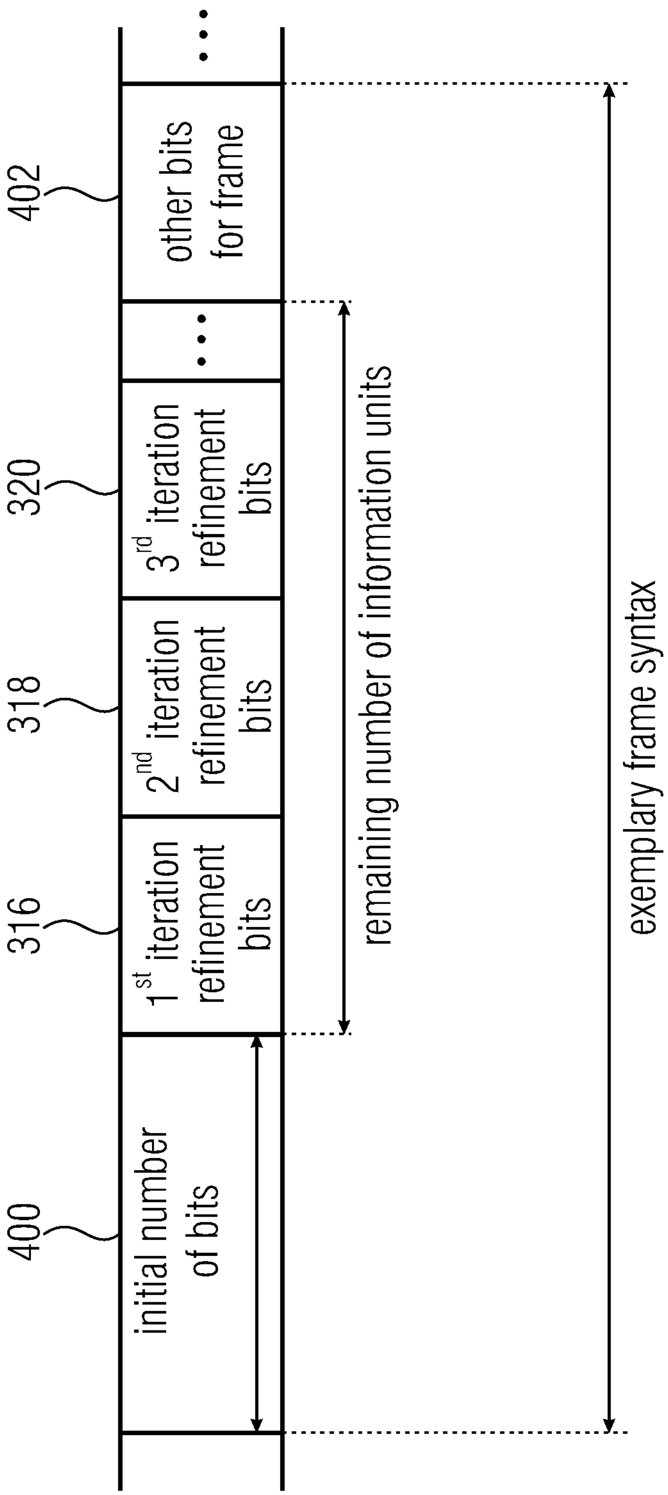
FIG. 4*a* illustrates an exemplary frame syntax for a first or second frame with iteration refinement bits.
Figure 8:
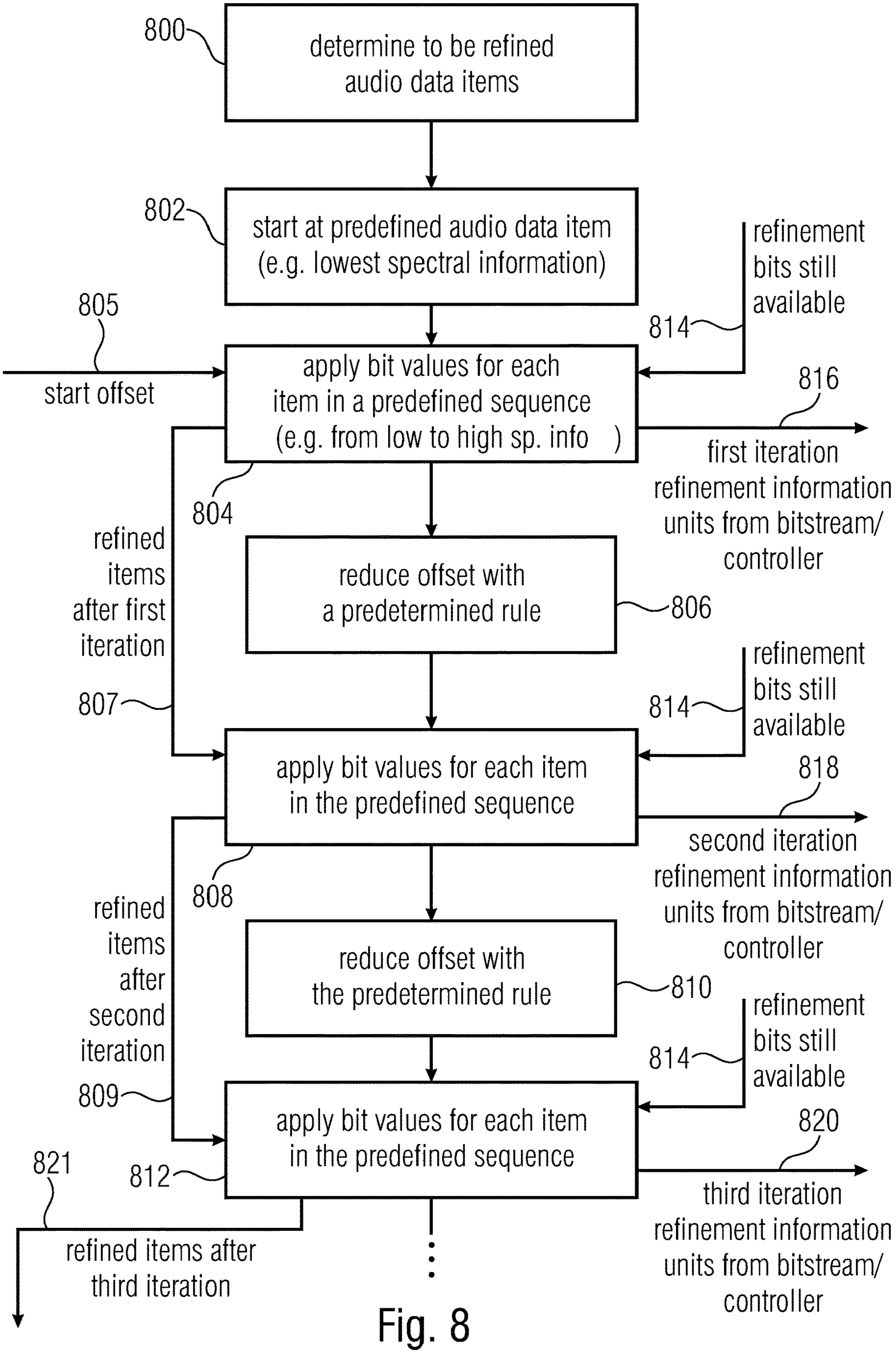
FIG. 8 illustrates an implementation of the refinement decoding stage of FIG. 7.

FIG. 4*a* illustrates an exemplary frame syntax with the information units or bits for the first frame or the second frame. A portion of the bit data for the frame is made up by the initial number of bits, i.e., item 400. Additionally, the first iteration refinement bits 316, the second iteration refinement bits 318 and the third iteration refinement bits 320 are also included in the frame. Particularly, in accordance with the frame syntax, the decoder is in the position to identify which bits of the frame are the initial number of bits, which bits are the first, second or third iteration refinements bits 316, 318, 320 and which bits in the frame are any other bits 402 such any side information that may, for example, also include an encoded representation of a global gain (gg) for example which can, for example, be calculated by the controller 200 directly or which can be, for example, influenced by the controller by means of a controller output information 21. Within section 316, 318, 320, a certain sequence of individual information units is given. This sequence may be so that the bits in the bit sequence are applied to the initially decoded audio data items to be decoded. Since it is not useful, with respect to bitrate requirements, to explicitly signal anything regarding the first, second and third iteration refinement bits, the order of the individual bits in the blocks 316, 318, 320 should be the same as the corresponding order of the surviving audio data items. In view of that, it is if advantage to use the same iteration procedure on the encoder side as illustrated in FIG. 3 and on the decoder side as illustrated in FIG. 8. It is not necessary to signal any specific bit allocation or bit association at least in the blocks 316 to 320.

Furthermore, the numbers of initial number of bits on the one hand and the remaining number of bits on the other hand is only exemplary. Typically, the initial number of bits that typically encode the most significant bit portion of the audio data item such as spectral values or tuples of spectral values is greater than the iteration refinement bits that represent the least significant portion of the "surviving" audio data items. Furthermore, the initial number of bits 400 are typically determined by means of an entropy coder or arithmetic encoder, but the iteration refinement bits are determined using a residual or bit encoder operating on an information unit granularity. Although the refinement coding stage does not perform any entropy coding or so, the encoding of the least significant bit portion of the audio data items nevertheless is more efficiently done by the refinement coding stage, since one can assume that the least significant bit portion of the audio data items such as spectral values are equally distributed and, therefore, any entropy coding with a variable length code or an arithmetic code together with a certain context does not introduce any additional advantage, but to the contrary even introduces additional overhead.

In other words, for the least significant bit portion of the audio data items, the usage of an arithmetic coder would be less efficient than the usage of a bit encoder, since the bit encoder does not require any bitrate for a certain context. The intentional reduction of audio data items as induced by the controller not only enhances the precision of the dominant spectral lines or line tuples, but additionally, provides a highly efficient encoding operation for the purpose of refining the MSB portions of these audio data items represented by the arithmetic or variable length code.

In view of that several and for example the following advantages are obtained by means of the implementation of the coder processor 15 of FIG. 1 as illustrated in FIG. 2 with the initial coding stage 151 on the one hand and the refinement coding stage 152 on the other hand.

An efficient two-stage coding scheme is proposed, comprising a first entropy coding stage and a second residual coding stage based on single-bit (non-entropy) encoding.

The scheme employs a low complexity global gain estimator which incorporates an energy based bit-consumption estimator for the first coding stage featuring a signal-adaptive noise floor adder.

The noise floor adder effectively transfers bits from the first encoding stage to the second encoding stage for highly tonal signals while leaving the estimate for other signal types unchanged. This shift of bits from an entropy coding stage to a non-entropy coding stage is fully efficient for highly tonal signals.

Figure 4B:
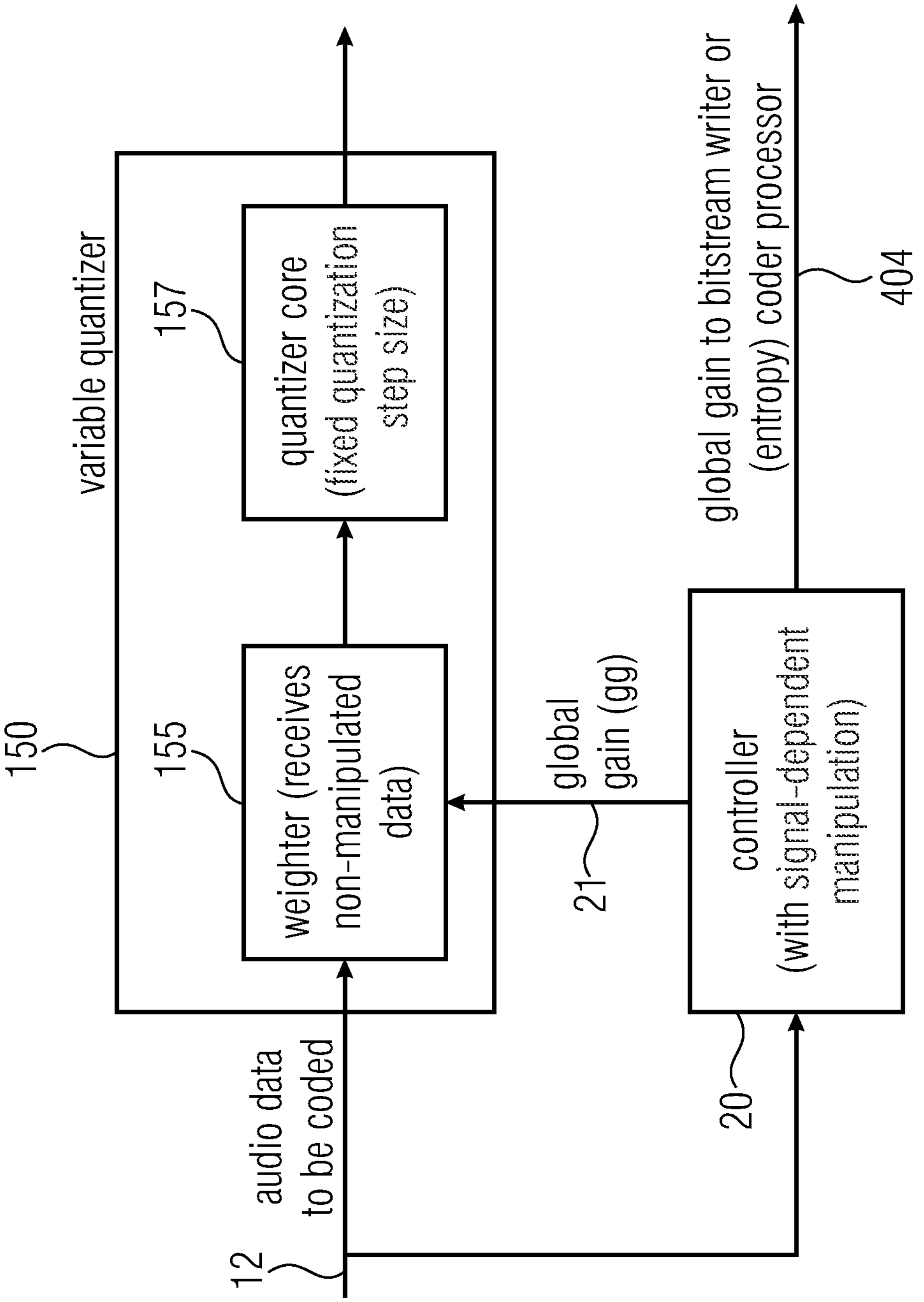
FIG. 4*b* illustrates an implementation of an audio data item reducer as a variable quantizer.
Figure 13:
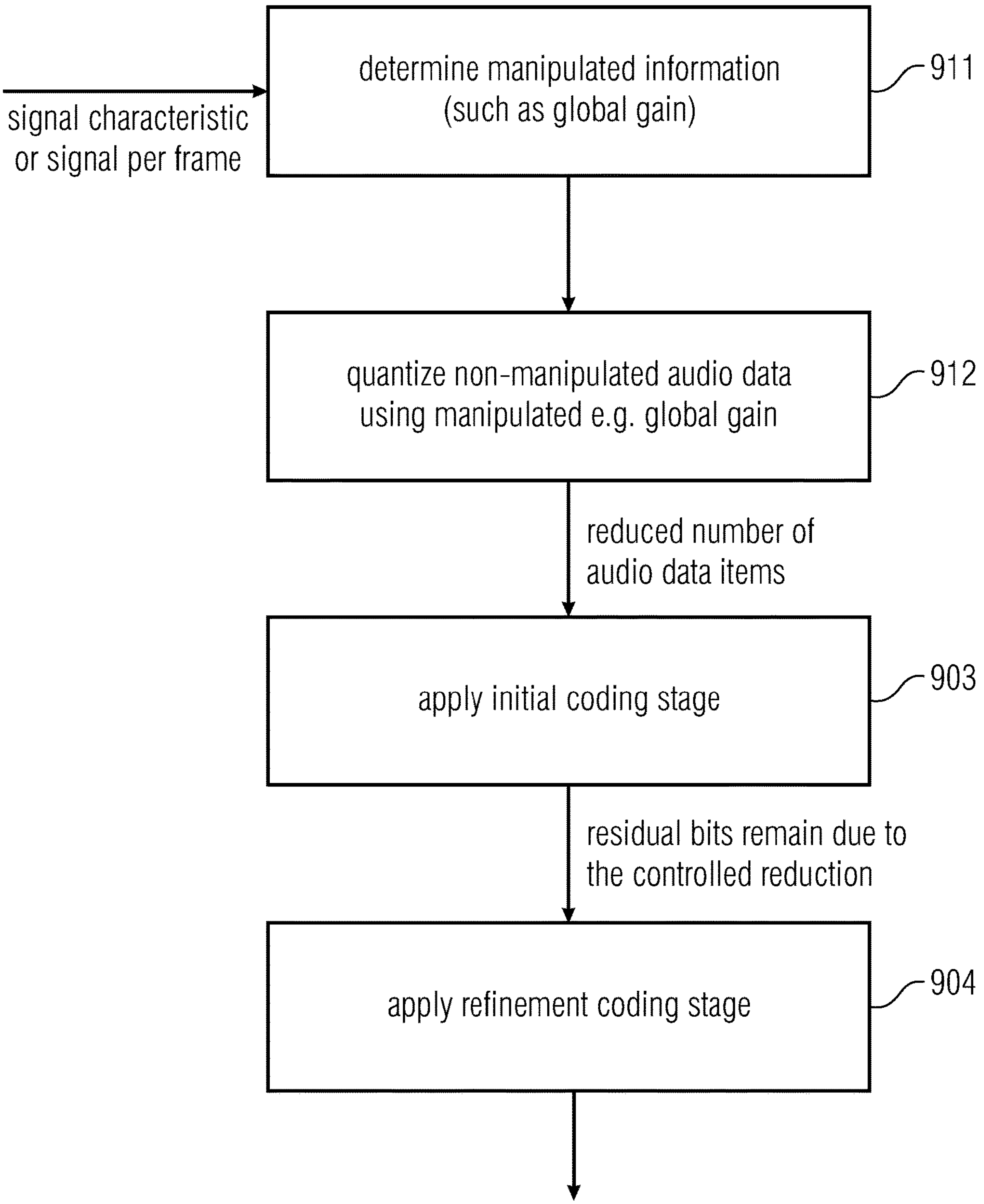
FIG. 13 illustrates an implementation of the integrated audio data item reduction.

FIG. 4*b* illustrates an implementation of the variable quantizer that may, for example, be implemented to perform the audio data item reduction in a controlled way advantageously in the integrated reduction mode illustrated with respect to FIG. 13. To this end, the variable quantizer comprises a weighter 155 that receives the (non-manipulated) audio data to be coded illustrated at line 12. This data is also input into the controller 20, and the controller is configured to calculate a global gain 21, but based on the non-manipulated data as input into the weighter 155, and using a signal-dependent manipulation. The global gain 21 is applied in the weighter 155, and the output of the weighter is input into a quantizer core 157 that relies on a fixed quantization step size. The variable quantizer 150 is implemented as a controlled weighter where the control is done using the global gain (gg) 21 and the subsequently connected fixed quantization step size quantizer core 157. However, other implementations could be performed as well such as a quantizer core having a variable quantization step size that is controlled by a controller 20 output value.

Figure 5:
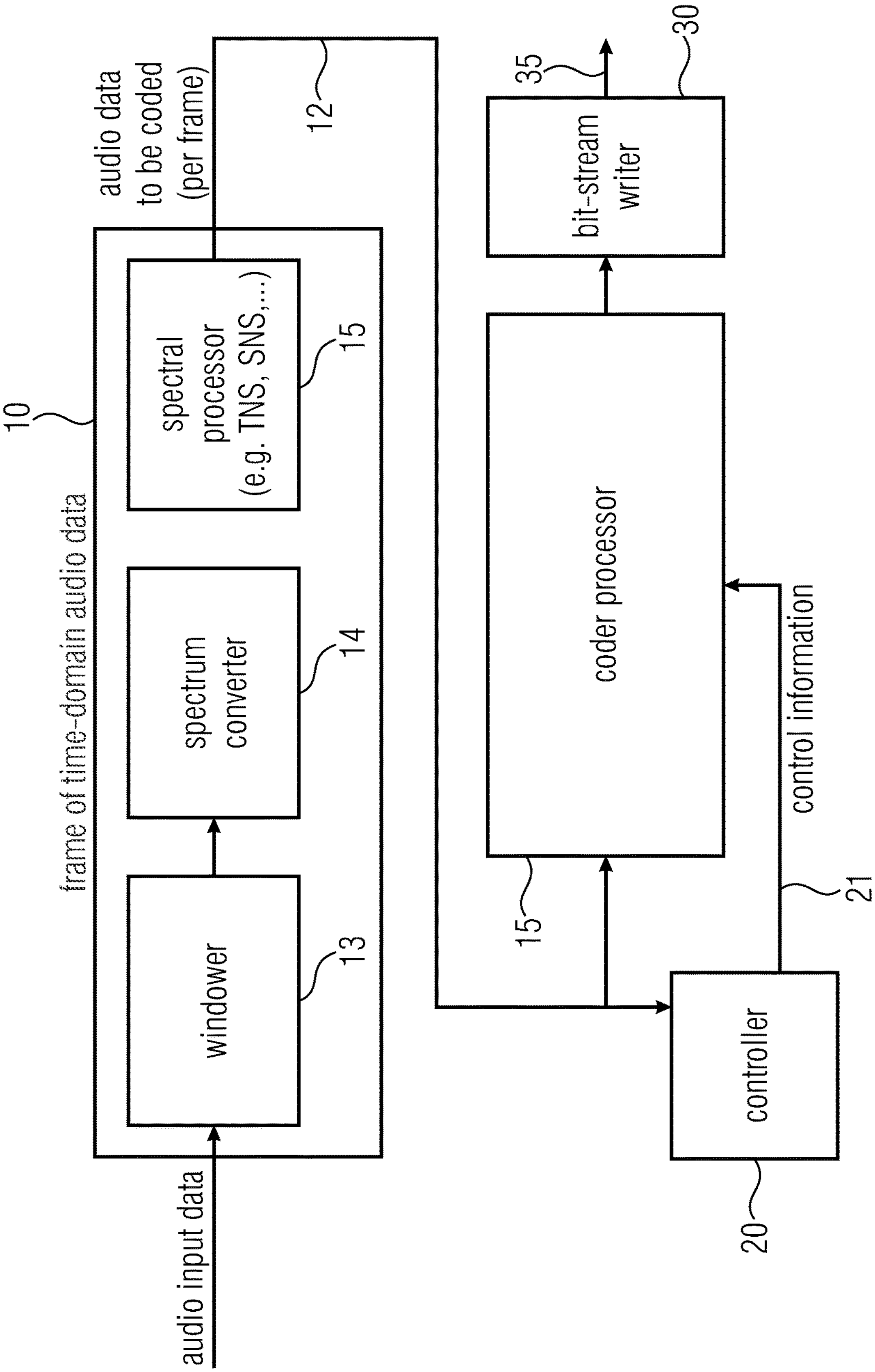
FIG. 5 illustrates an implementation of the audio encoder with a spectrum preprocessor.

FIG. 5 illustrates an implementation of the audio encoder and, particularly, a certain implementation of the preprocessor 10 of FIG. 1. Advantageously, the preprocessor comprises a windower 13 that generates, from the audio input data 11, a frame of time-domain audio data windowed using a certain analysis window that may, for example, be a cosine window. The frame of time-domain audio data is input into a spectrum converter 14 that may be implemented to perform a modified discrete cosine transform (MDCT) or any other transform such as FFT or MDST or any other time-spectrum-conversion. Advantageously, the windower operates with a certain advance control so that an overlapping frame generation is done. In case of a 50% overlap, the advance value of the windower is half the size of the analysis window applied by the windower 13. A (non-quantized) frame of spectral values output by the spectrum converter is input into a spectral processor 15 that is implemented to perform some kind of spectral processing such as performing a temporal noise shaping operation, a spectral noise shaping operation, or any other operation such as a spectral whitening operation, by which the modified spectral values generated by the spectral processor have a spectral envelope being flatter than a spectral envelope of the spectral values before the processing by the spectral processor 15. The audio data to be coded (per frame) are forwarded via line 12 into the coder processor 15 and into the controller 20, where the controller 20 provides the control information via line 21 to the coder processor 15. The coder processor outputs its data to a bitstream writer 30 being implemented, for example, as a bit stream multiplexer, and the encoded frames are output on line 35.

Figure 6:
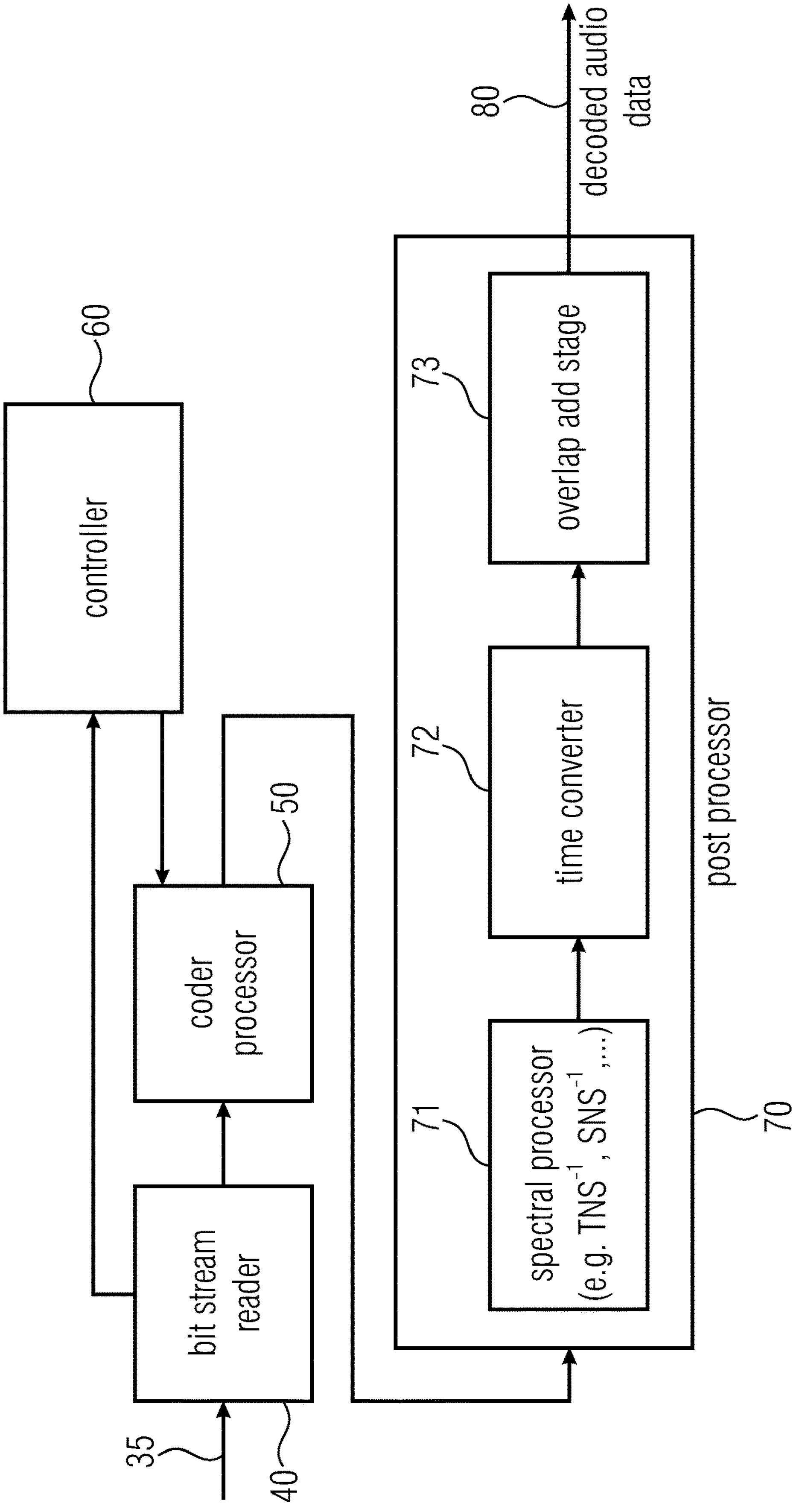
FIG. 6 illustrates an embodiment of an audio decoder with a time post processor.
Figure 7:
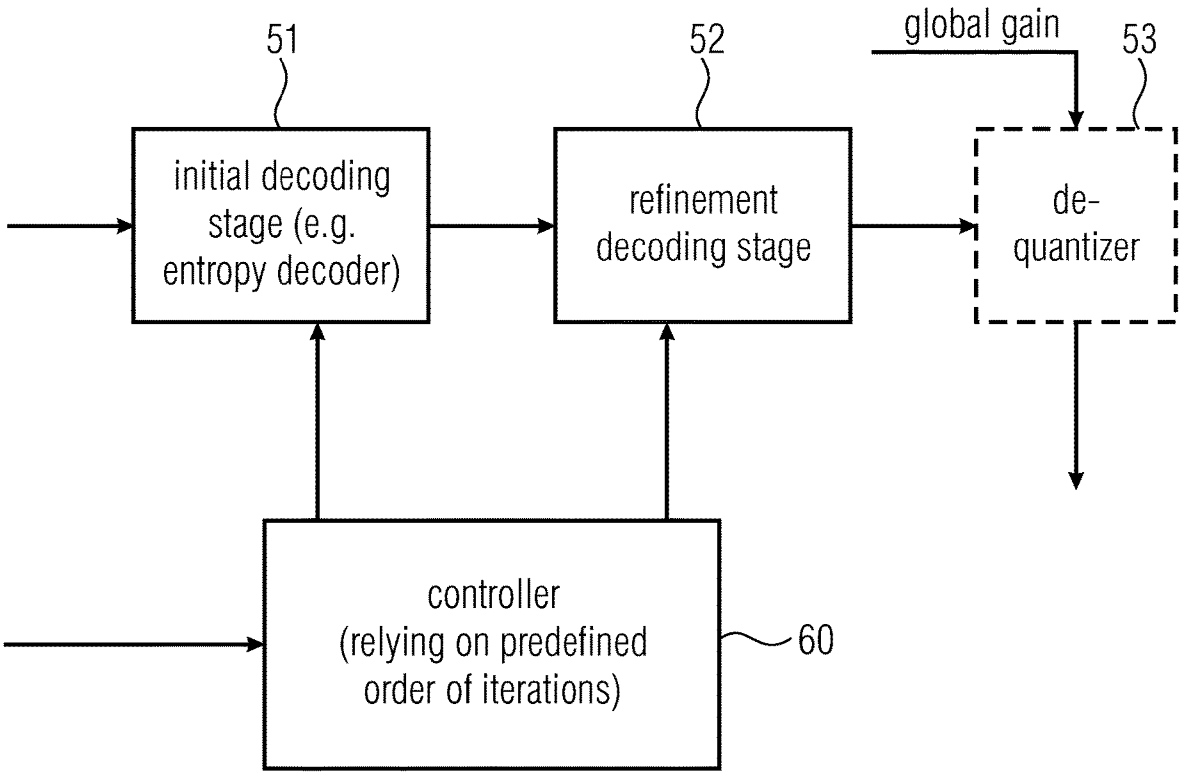
FIG. 7 illustrates an implementation of the coder processor of the audio decoder of FIG. 6.

With respect to a decoder-side processing, reference is made to FIG. 6. The bitstream output by block 30 may, for example, be directly input into the bitstream reader 40 subsequent to some kind of storage or transmission. Naturally, any other processing may be performed between the encoder and the decoder such as a transmission processing in accordance with a wireless transmission protocol such as a DECT protocol or the Bluetooth protocol or any other wireless transmission protocol. The data input into an audio decoder shown in FIG. 6 is input into a bitstream reader 40. The bitstream reader 40 reads the data and forwards the data to a coder processor 50 that is controlled by a controller 60. Particularly, the bitstream reader receives encoded data, where the encoded audio data comprise, for a frame, a frame initial number of information units and a frame remaining number of information units. The coder processor 50 processes the encoded audio data, and the coder processor 50 comprises an initial decoding stage and a refinement decoding stage as illustrated in FIG. 7 at item 51 for the initial decoding stage and at item 52 for the refinement decoding stage that are both controlled by the controller 60. The controller 60 is configured to control the refinement decoding stage 52 to use, when refining initially decoded data items as output by the initial decoding stage 51 of FIG. 7, at least two information units of the remaining number of information units for refining one and the same initially decoded data item. Additionally, the controller 60 is configured to control the coder processor so that the initial decoding stage uses the frame initial number of information units to obtain initially decoded data items at the line connecting block 51 and 52 in FIG. 7, where, advantageously, the controller 60 receives an indication of the frame initial number of information units on the one hand and the frame initial remaining number of information units from the bitstream reader 40 as indicated by the input line into block 60 of FIG. 6 or FIG. 7. The post processor 70 processes the refined audio data items to obtain decoded audio data 80 at the output of the post processor 70.

In an implementation for an audio decoder that corresponds to the audio encoder of FIG. 5, the post processor 70 comprises as an input stage, a spectral processor 71 that performs an inverse temporal noise shaping operation, or an inverse spectral noise shaping operation or an inverse spectral whitening operation or any other operation that reduces some kind of processing applied by the spectral processor 15 of FIG. 5. The output of the spectral processor is input into a time converter 72 that operates to perform a conversion from a spectral domain to a time domain and advantageously, the time converter 72 matches with the spectrum converter 14 of FIG. 5. The output of the time converter 72 is input into an overlap-add stage 73 that performs an overlap/adding operation for a number of overlapping frames such as at least two overlapping frames in order to obtain the decoded audio data 80. Advantageously, the overlap-add stage 73 applies a synthesis window to the output of the time converter 72, where this synthesis window matches with the analysis window applied by the analysis windower 13. Furthermore, the overlap operation performed by block 73 matches with the block advance operation performed by the windower 13 of FIG. 5.

As illustrated in FIG. 4*a*, the frame remaining number of information units comprise calculated values of information units 316, 318, 320 for at least two sequential iterations in a predetermined order, where, in the FIG. 4*a* embodiment, even three iterations are illustrated. Furthermore, the controller 60 is configured to control the refinement decoding stage 52 to use, for a first iteration, the calculated values such as block 316 for the first iteration in accordance with the predetermined order and to use, for a second iteration, the calculated values from block 318 for the second iteration in the predetermined order.

Subsequently, an implementation of the refinement decoding stage under the control of the controller 60 is illustrated with respect to FIG. 8. In step 800, the controller or the refinement decoding stage 52 of FIG. 7 determines the to be refined audio data items. These audio data items are typically all the audio data items that are output by block 51 of FIG. 7. As indicated in step 802, a start at a predefined audio data item such as the lowest spectral information is performed. Using a start offset 805 the first iteration refinement information units received from the bitstream or from the controller 16, e.g. the data in block 316 of FIG. 4*a* are applied 804 for each item in a predefined sequence where the predefined sequence extends from a low to a high spectral value/spectral tuple/spectral information. The results are refined audio data items after the first iteration as illustrated by line 807. In step 808, the bit values for each item in the predefined sequence are applied, where the bit values come from the second iteration refinement information units as illustrated at 818, and these bits are received from the bitstream reader or the controller 60 depending on the specific implementation. The result of step 808 are the refined items after the second iteration. Again, in step 810, the offset is reduced in line with the predetermined offset reduction rule that has already been applied in block 806. With the reduced offset, the bit values for each item in the predefined sequence are applied as illustrated at 812 using the third iteration refinement information units received, for example, from the bitstream or from the controller 60. The third iteration refinement information units are written in the bitstream at item 320 of FIG. 4*a*. The result of the procedure in block 812 are refined items after the third iteration as indicated at 821.

This procedure is continued until all iteration refinement bits included in the bitstream for a frame are processed. This is checked by the controller 60 via control line 814 that controls a remaining availability of refinement bits advantageously for each iteration but at least for the second and the third iterations processed in blocks 808, 812. In each iteration, the controller 60 controls the refinement decoding stage to check, whether a number of already read information units is lower than the number of information units in the frame remaining information units for the frame to stop the second iteration in case of a negative check result, or in case of a positive check result, to perform a number of further iterations until a negative check result is obtained. The number of further iterations is at least one. Due to the application of similar procedures on the encoder-side discussed in the context of FIG. 3 and on the decoder side as outlined in FIG. 8, any specific signaling is not necessary. Instead, the multiple iteration refinement processing takes place in a highly efficient manner without any specific overhead. In an alternative embodiment, a check for a maximal number of iterations can be omitted, if the non-zero spectral lines were counted first and the number of residual bits were adjusted accordingly for each iteration.

In the implementation, the refinement decoding stage 52 is configured to add an offset to the initially decoded data item, when a read information data unit of the frame remaining number of information units has a first value and to subtract an offset from the initially decoded item, when the read information data unit of the frame remaining number of information units has a second value. This offset is, for the first iteration, the start offset 805 of FIG. 8. In the second iteration as illustrated at 808 in FIG. 8, a reduced offset as generated by block 806 is used for an adding of a reduced or second offset to a result of the first iteration, when a read information data unit of the frame remaining number of information units has a first value, and for a subtracting the second offset from the result of the first iteration, when the read information data unit of the frame remaining number of information units has a second value. Generally, the second offset is lower than the first offset and it is of advantage that the second offset is between 0.4 and 0.6 times the first offset and most advantageously at 0.5 times the first offset.

Figure 9:
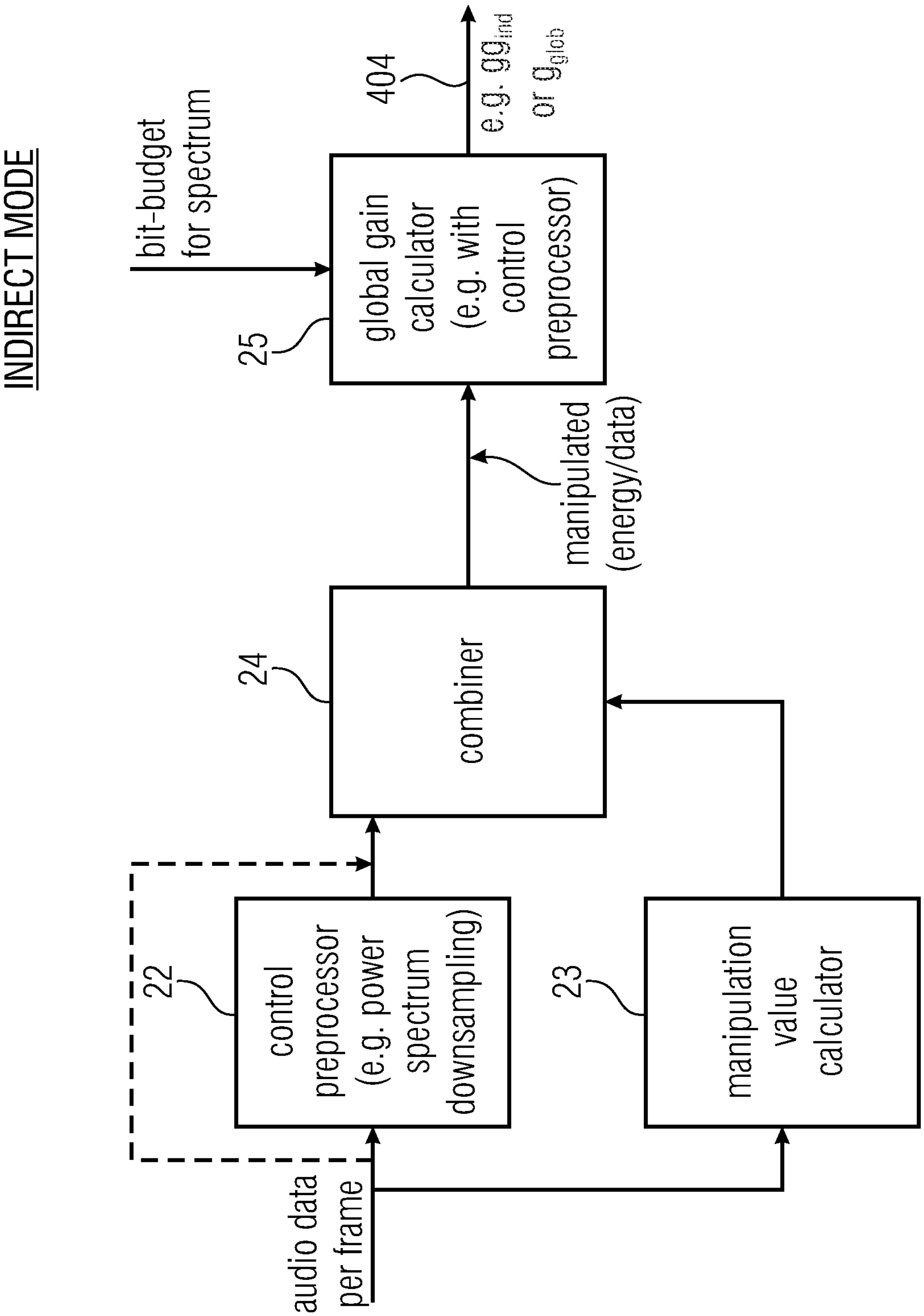
FIG. 9 illustrates an implementation of an indirect mode for the control value calculation.

In an implementation of the present invention using an indirect mode illustrated in FIG. 9, any explicit signal characteristic determination is not necessary. Instead, a manipulation value is calculated advantageously using the embodiment illustrated in FIG. 9. For the indirect mode, the controller 20 is implemented as indicated in FIG. 9. Particularly, the controller comprises a control preprocessor 22, a manipulation value calculator 23, a combiner 24 and a global gain calculator 25 that, in the end, calculates a global gain for the audio data item reducer 150 of FIG. 2 that is implemented as a variable quantizer illustrated in FIG. 4*b*. Particularly, the controller 20 is configured to analyze the audio data of the first frame to determine a first control value for the variable quantizer for the first frame and for analyzing the audio data of the second frame to determine a second control value for the variable quantizer for the second frame, the second control value being different from the first control value. The analysis of the audio data of a frame is performed by the manipulation value calculator 23. The controller 20 is configured to perform a manipulation of the audio data of the first frame. In this operation, the control preprocessor 20 illustrated in FIG. 9 is not there and, therefore, the bypass line for block 22 is active.

When, however, the manipulation is not performed to the audio data of the first frame or the second frame, but is applied to amplitude-related values derived from the audio data of the first frame or the second frame, the control preprocessor 22 is there and the bypass line is not existing. The actual manipulation is performed by the combiner 24 that combines the manipulation value output from block 23 to the amplitude-related values derived from the audio data of a certain frame. At the output of the combiner 24, there do exist manipulated (advantageously energy) data, and based on these manipulated data, a global gain calculator 25 calculates a global gain or at least a control value for the global gain indicated at 404. The global gain calculator 25 has to apply restrictions with respect to an allowed bit-budget for the spectrum so that a certain data rate or a certain number of information units allowed for a frame is obtained.

Figure 11:
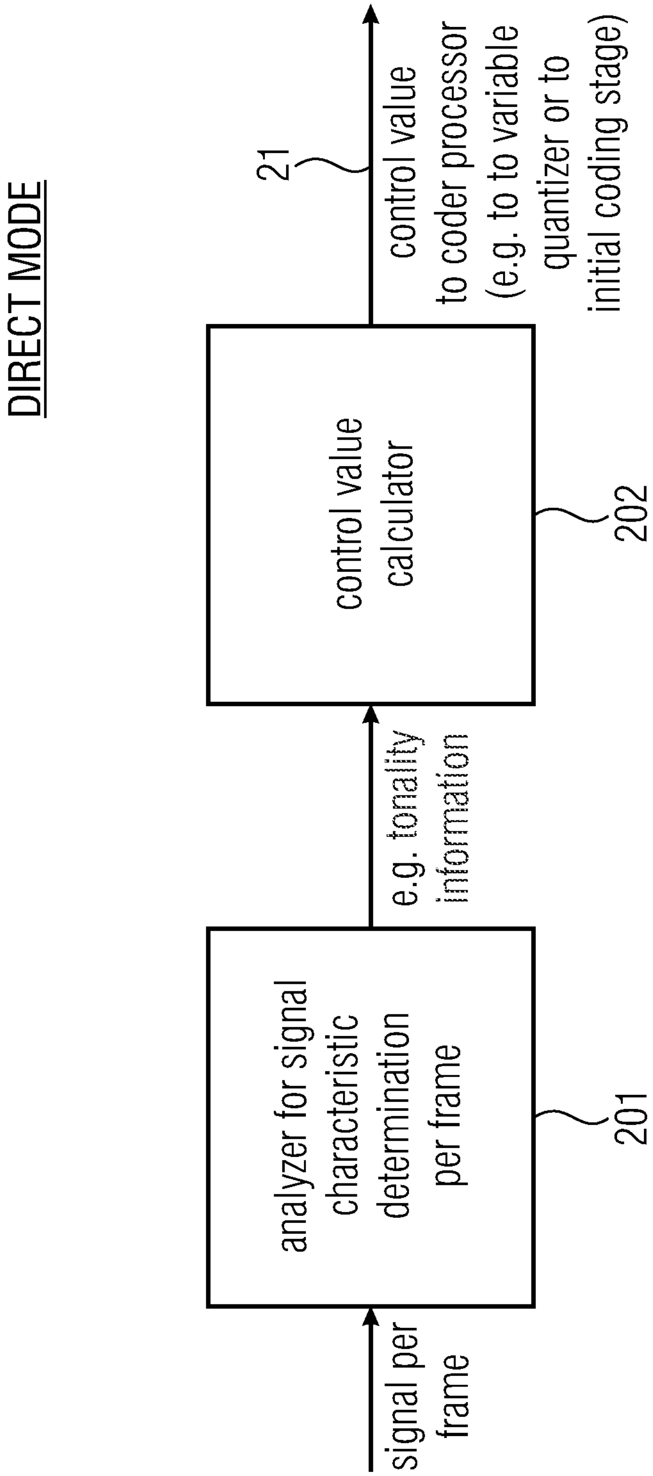
FIG. 11 illustrates a direct mode control value calculation.

In the direct mode illustrated at FIG. 11, the controller 20 comprises an analyzer 201 for the signal characteristic determination per frame and the analyzer 208 outputs, for example, quantitative signal characteristic information such as tonality information and controls a control value calculator 202 using this advantageously quantitative data. One procedure for calculating the tonality of a frame is to calculate the spectral flatness measure (SFM) of a frame. Any other tonality determination procedures or any other signal characteristic determination procedures can be performed by block 201 and a translation from a certain signal characteristic value to a certain control value is to be performed in order to obtain an intended reduction of the number of audio data items for a frame. The output of the control value calculator 202 for the direct mode of FIG. 11 can be a control value to the coder processor such as to the variable quantizer or, alternatively, to the initial coding stage. When a control value is given to the variable quantizer, the integrated reduction mode is performed while, when the control value is given to the initial coding stage, a separated reduction is performed. Another implementation of the separated reduction would be to remove or influence specifically selected non-quantized audio data items present before the actual quantization so that, by means of a certain quantizer, such influenced audio data items are quantized to zero and are, therefore, eliminated for the purpose of entropy coding and subsequent refinement coding.

Although the indirect mode of FIG. 9 has been shown together with the integrated reduction, i.e., that the global gain calculator 25 is configured to calculate the variable global gain, the manipulated data output by the combiner 24 can also be used to directly control the initial coding stage to remove any certain quantized audio data items such as the smallest quantized data items or, alternatively, the control value can also be sent to a non-illustrated audio data influencing stage that influences the audio data before the actual quantization using a variable quantization control value that has been determined without any data manipulation and, therefore, typically obeys psychoacoustic rules that, however, are intentionally violated by the procedures of the present invention.

As illustrated in FIG. 11 for the direct mode, the controller is configured to determine the first tonality characteristic as the first signal characteristic and to determine a second tonality characteristic as the second signal characteristic in such a way that a bit-budget for the refinement coding stage is increased in case of a first tonality characteristic compared to the bit-budget for the refinement coding stage in case of a second tonality characteristic, wherein the first tonality characteristic indicates a greater tonality than the second tonality characteristic.

The present invention does not result in a coarser quantization that is typically obtained by applying a greater global gain. Instead, this calculation of the global gain based on a signal-dependent manipulated data only results in a bit-budget shift from the initial coding stage that receives a smaller bit-budget to the refinement decoding stage that receives a higher bit-budget, but this bit-budget shift is done in a signal-dependent way and is greater for a higher tonality signal portion.

Advantageously, the control preprocessor 22 of FIG. 9 calculates amplitude-related values as a plurality of power values derived from one or more audio values of the audio data. Particularly, it is these power values that are manipulated using an addition of an identical manipulation value by means of the combiner 24, and this identical manipulation value that has been determined by the manipulation value calculator 23 is combined with all power values of the plurality of power values for a frame.

Alternatively, as indicated by the bypass line, values obtained by the same magnitude of the manipulation value calculated by block 23, but advantageously with randomized signs, and/or values obtained by a subtraction of slightly different terms from the same magnitude (but advantageously with randomized signs) or complex manipulation value or, more generally, values obtained as samples from a certain normalized probability distribution scaled using the calculated complex or real magnitude of the manipulation value are added to all audio values of a plurality of audio values included in the frame. The procedure performed by the control preprocessor 22 such as calculating a power spectrum and downsampling can be included within the global gain calculator 25. Hence, advantageously, a noise floor is added either to the spectral audio values directly or alternatively to the amplitude-related values derived from the audio data per frame, i.e., the output of the control preprocessor 22. Advantageously, the controller preprocessor calculates a downsampled power spectrum which corresponds to the usage of an exponentiation with an exponent value being equal to 2. Alternatively, however, a different exponent value greater than 1 can be used. Exemplarily, an exponent value being equal to 3 would represent a loudness rather than a power. But, other exponent values such as smaller or greater exponent values can be used as well.

Figure 10:
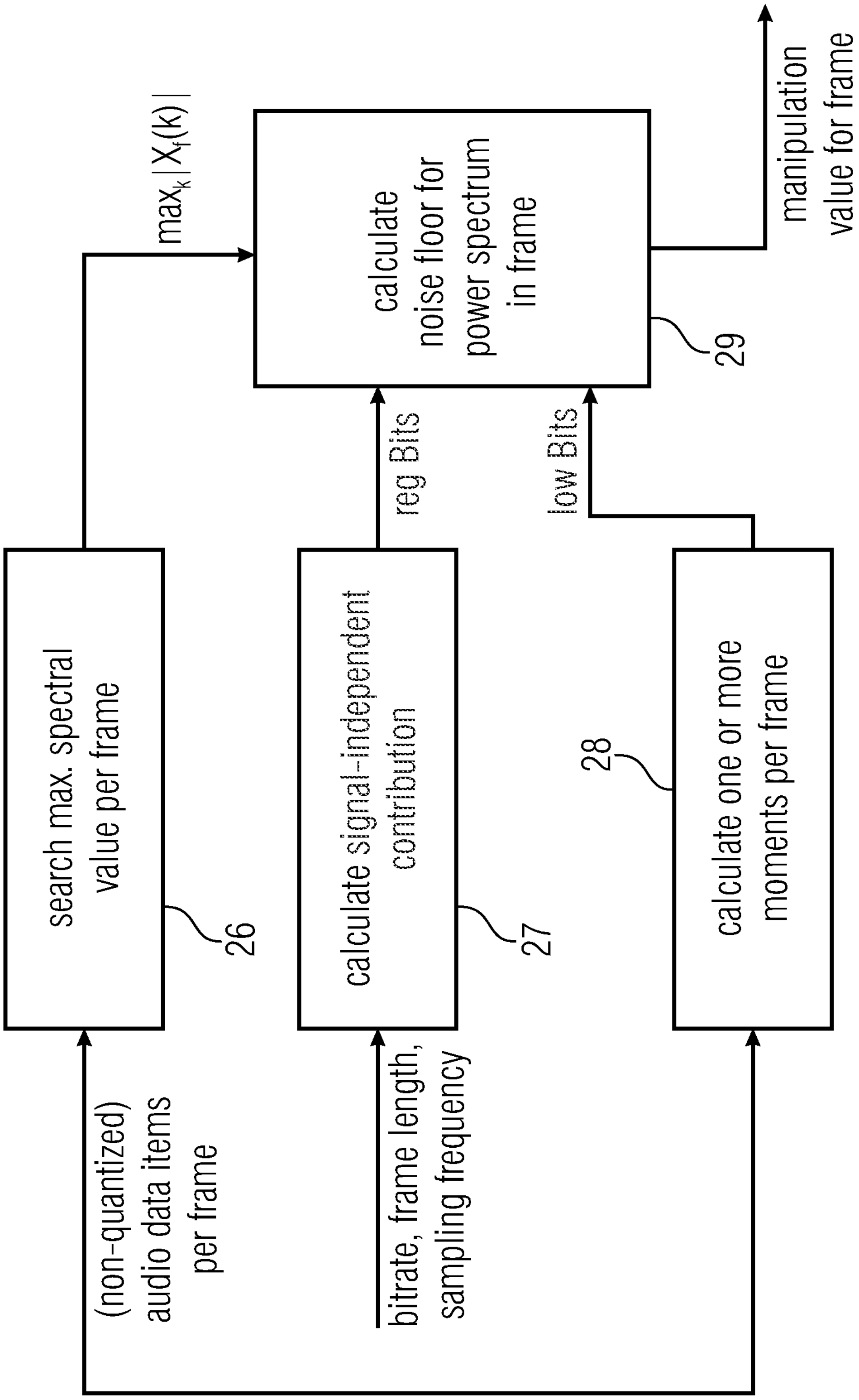
FIG. 10 illustrates an implementation of the manipulation value calculator of FIG. 9.

In the implementation illustrated in FIG. 10, the manipulation value calculator 23 comprises a searcher 26 for searching a maximum spectral value in a frame and at least one of the calculation of a signal-independent contribution indicated by item 27 of FIG. 10 or a calculator for calculating one or more moments per frame as illustrated by block 28 of FIG. 10. Basically, either block 26 or block 28 is there in order to provide a signal-dependent influence on the manipulation value for the frame. Particularly, the searcher 26 is configured to search for a maximum value of the plurality of audio data items or of the amplitude-related values or for searching a maximum value of a plurality of downsampled audio data or a plurality of downsampled amplitude-related values for the corresponding frame. The actual calculation is done by block 29 using the output of blocks 26, 27 and 28, where the blocks 26, 28 actually represent a signal analysis.

Advantageously, the signal-independent contribution is determined by means of a bitrate for an actual encoder session, a frame duration or a sampling frequency for an actual encoder session. Furthermore, the calculator 28 for calculating one or more moments per frame is configured to calculate a signal-dependent weighting value derived from at least of a first sum of magnitudes of the audio data or downsampled audio data within the frame, the second sum of magnitudes of the audio data or the downsampled audio data within the frame multiplied by an index associated with each magnitude and the quotient of the second sum and the first sum.

In an implementation performed by the global gain calculator 25 of FIG. 9, a used bit estimate is calculated for each energy value depending on the energy value and candidate value for the actual control value. The used bit estimates for the energy values and the candidate value for the control value are accumulated and it is checked, whether an accumulated bit estimate for the candidate value for the control value fulfills an allowed bit consumption criterion as, for example, illustrated in FIG. 9 as the bit-budget for the spectrum introduced into the global gain calculator 25. In case that the allowed bit consumption criterion is not fulfilled, the candidate value for the control value is modified and the calculation of the used bit estimate, the accumulation of the used bitrate and the checking of the fulfillment of the allowed bit consumption criterion for a modified candidate value for the control value is repeated. As soon as such an optimum control value is found, this value is output at line 404 of FIG. 9.

Subsequently, embodiments are illustrated.

Detailed Description of the Encoder (e.g. FIG. 5)

Notation

We denote by $f_s$ the underlying sampling frequency in Hz, by $N_{ms}$ the underlying frame duration in milliseconds and by br the underlying bitrate in bits per second.

Derivation of Residual Spectrum (e.g. Preprocessor 10)

The embodiment operates on a real residual spectrum $X_f(k)$, k=0 . . . N−1, that is typically derived by a time to frequency transform like an MDCT followed by psycho-acoustically motivated modifications like temporal noise shaping (TNS) to remove temporal structure and spectral noise shaping (SNS) to remove spectral structure. For audio content with slowly varying spectral envelope the envelope of the residual spectrum $X_f(k)$ is therefore flat.

Global Gain Estimation (e.g. FIG. 9)

Quantization of the spectrum is controlled by a global gain $g_{glob}$ via $$X_q(k) = \text{round}\left(\frac{X_f(k)}{g_{glob}}\right)$$

The initial global gain estimate (item 22 of FIG. 9) derived from the power spectrum $X(k)^2$ after downsampling by a factor of 4, $$PX_{lp}(k)=X_f(4k)^2+X_f(4k+1)^2+X_f(4k+2)^2+X_f(4k+3)^2$$

and a signal adaptive noise floor $N(X_f)$ which is given by $$N(X_f) = \max_k |X_f(k)| * 2^{-regBits-lowBits}. \text{(e.g. item 23 of FIG. 9)}$$

The parameter regBits depends on bitrate, frame duration and sampling frequency and is computed as $$regBits = \left\lfloor \frac{br}{12500} \right\rfloor + C(N_{ms}, f_s) \text{(e.g. item 27 of FIG. 10)}$$

with $C(N_{ms}, f_s)$ as specified in the table below.

| $N_{ms}\backslash f_s$ | 48000 | 96000 |
|---|---|---|
| 2.5 | −6 | −6 |
| 5 | 0 | 0 |
| 10 | 2 | 5 |

The parameter lowBits depends on the center of mass of the absolute values of the residual spectrum and is computed as $$lowBits = \frac{4}{N_{ms}}\left(2N_{ms} - \min\left(\frac{M_1}{M_0}, 2N_{ms}\right)\right), \text{(e.g. item 28, FIG. 10)}$$

where $$M_0 = \sum_{k=0}^{N-1} |X_f(k)|$$

and

-continued $$M_1 = \sum_{k=0}^{N-1} k|X_f(k)|$$

are moments of the absolute spectrum.

The global gain is estimated in the form $$g_{glob} = 10^{\frac{gg_{ind}+gg_{off}}{28}}$$

from the values $E(k)=10\log_{10}(PX_{lp}(k)+N(X_f)+2^{-31})$, (e.g. output of combiner 24 of FIG. 9) where $gg_{off}$ is a bitrate and sampling frequency dependent offset.

It should be noted that adding the noise-floor term $N(X_f)$ to $PX_{lp}(k)$ gives the expected result of adding a corresponding noise-floor to the residual spectrum $X_f(k)$, e. g. randomly adding or subtracting the term $0.5\sqrt{N(X_f)}$ to each spectral line, before calculating the power spectrum.

Pure power spectrum based estimates can already be found e.g. in the 3GPP EVS codec (3GPP TS 26.445, section 5.3.3.2.8.1). In embodiments, the addition of the noise floor $N(X_f)$ is done. The noise floor is signal adaptive in two ways.

First, it scales with the maximal amplitude of $X_f$. Therefore, the impact on the energy of a flat spectrum, where all amplitudes are close to the maximal amplitude, is very small. But for highly tonal signals, where the spectrum and in extension also the residual spectrum features a number of strong peaks, the overall energy is increased significantly which increases the bit-estimate in the global gain computation as outlined below.

Second, the noise floor is lowered through the parameter lowBits if the spectrum exhibits a low center of mass. In this case a low frequency content is dominant whence the loss of high frequency components is likely not as critical as for high pitched tonal content.

The actual estimate of the global gain is performed (e.g. block 25 of FIG. 9) by a low-complexity bisection search as outlined in the C code below, where $nbits'_{spec}$ denotes the bit-budget for encoding the spectrum. The bit-consumption estimate (accumulated in the variable tmp) is based on the energy values E(k) taking into account a context dependency in the arithmetic encoder used for stage 1 encoding.

```
fac = 256;
gg_ind = 255;
for (iter = 0; iter < 8; iter++)
{
  fac >>= 1;
  gg_ind -= fac;
  tmp = 0;
  iszero = 1;
  for (i = N/4-1; i >= 0; i--)
  {
    if (E[i]*28/20 < (gg_ind+gg_off))
    {
      if (iszero == 0)
      {
        tmp += 2.7*28/20;
      }
    }
    else
    {
      if ((gg_ind+gg_off) < E[i]*28/20 - 43*28/20)
      {
        tmp += 2*E[i]*28/20 - 2*(gg_ind+gg_off) - 36*28/20;
      }
```

-continued

```
      else
      {
        tmp += E[i]*28/20 - (gg_ind+gg_off) + 7*28/20;
      }
      iszero = 0;
    }
  }
  if (tmp > nbits'_spec*1.4*28/20 && iszero == 0)
  {
    gg_ind += fac;
  }
}
```

Residual Coding (e.g. FIG. 3)

Residual coding uses the excess bits that are available after arithmetic encoding of the quantized spectrum $X_q(k)$. Let B denote the number of excess bits and let K denote the number of encoded non-zero coefficients $X_q(k)$. Furthermore, let $k_i$, i=1 . . . K, denote the enumeration of these non-zero coefficients from lowest to highest frequency. The residual bits $b_i(j)$ (taking values 0 and 1) for coefficient $k_i$ are calculated as to minimize the error $$g_{glob}\left(X_q(k_i) - \sum_{j=1}^{n_i}(-1)^{b_i(j)} * 2^{-j-1}\right) - X_f(k).$$

This can be done in an iterative fashion testing whether $$g_{glob}\left(X_q(k_i) - \sum_{j=1}^{n-1}(-1)^{b_i(j)} * 2^{-j-1}\right) - X_f(k) > 0. \tag{1}$$

If (1) is true then the nth residual bit $b_i(n)$ for coefficient $k_i$ is set to 0 and otherwise it is set to 1. The calculation of residual bits is carried out by calculating a first residual bit for every $k_i$ and then a second bit and so on until all residual bits are spent or a maximal number $n_{max}$ of iterations is carried out. This leaves $$n_i = \min\left(\left\lfloor\frac{B-i-1}{K}\right\rfloor + 1,\ n_{max}\right)$$

residual bits for coefficient $X_q(k_i)$. This residual coding scheme improves the residual coding scheme that is applied in the 3GPP EVS codec which spends at most one bit per non-zero coefficient.

The calculation of residual bits with $n_{max}=20$ is illustrated by the following pseudo-code, where gg denotes the global gain:

```
iter = 0;
nbits_residual = 0;
offset = 0.25;
while (nbits_residual < nbits_residual_max && iter < 20)
{
  k = 0;
  while (k < N_E && nbits_residual < nbits_residual_max)
  {
    if (X_q[k] != 0)
    {
      if (X_f[k] >= X_q[k]*gg)
      {
        res_bits[nbits_residual] = 1;
```

-continued

```
          Xf[k] -= offset * gg;
        }
        else
        {
          res_bits[nbits_residual] = 0;
          Xf[k] += offset * gg;
        }
        nbits_residual++;
      }
      k++;
    }
    iter++;
    offset /= 2;
}
```

Description of the Decoder (e.g. FIG. 6)

At the decoder, the entropy encoded spectrum $\hat{X}_q$ is obtained by entropy decoding. The residual bits are used to refine this spectrum as demonstrated by the following pseudo code (see also e.g. FIG. 8).

```
iter = n = 0;
offset = 0.25;
while (iter < 20 && n < nResBits)
{
  k = 0;
  while (k < N_E && n < nResBits)
  {
    if (X̂q [k] != 0)
    {
      if (resBits[n++] == 0)
      {
        X̂q [k] -= offset;
      }
      else
      {
        X̂q [k] +=offset;
      }
    }
    k++;
  }
  iter ++;
  offset /= 2;
}
```

The decoded residual spectrum is given by $$\hat{X}_f(k)=g_{glob}\hat{X}_q(k).$$

CONCLUSIONS

An efficient two-stage coding scheme is proposed, comprising a first entropy coding stage and a second residual coding stage based on single-bit (non-entropy) encoding.

The scheme employs a low complexity global gain estimator which incorporates an energy based bit-consumption estimator for the first coding stage featuring a signal-adaptive noise floor adder.

The noise floor adder effectively transfers bits from the first encoding stage to the second encoding stage for highly tonal signals while leaving the estimate for other signal types unchanged. It is argued that this shift of bits from an entropy coding stage to a non-entropy coding stage is fully efficient for highly tonal signals.

Figure 12:
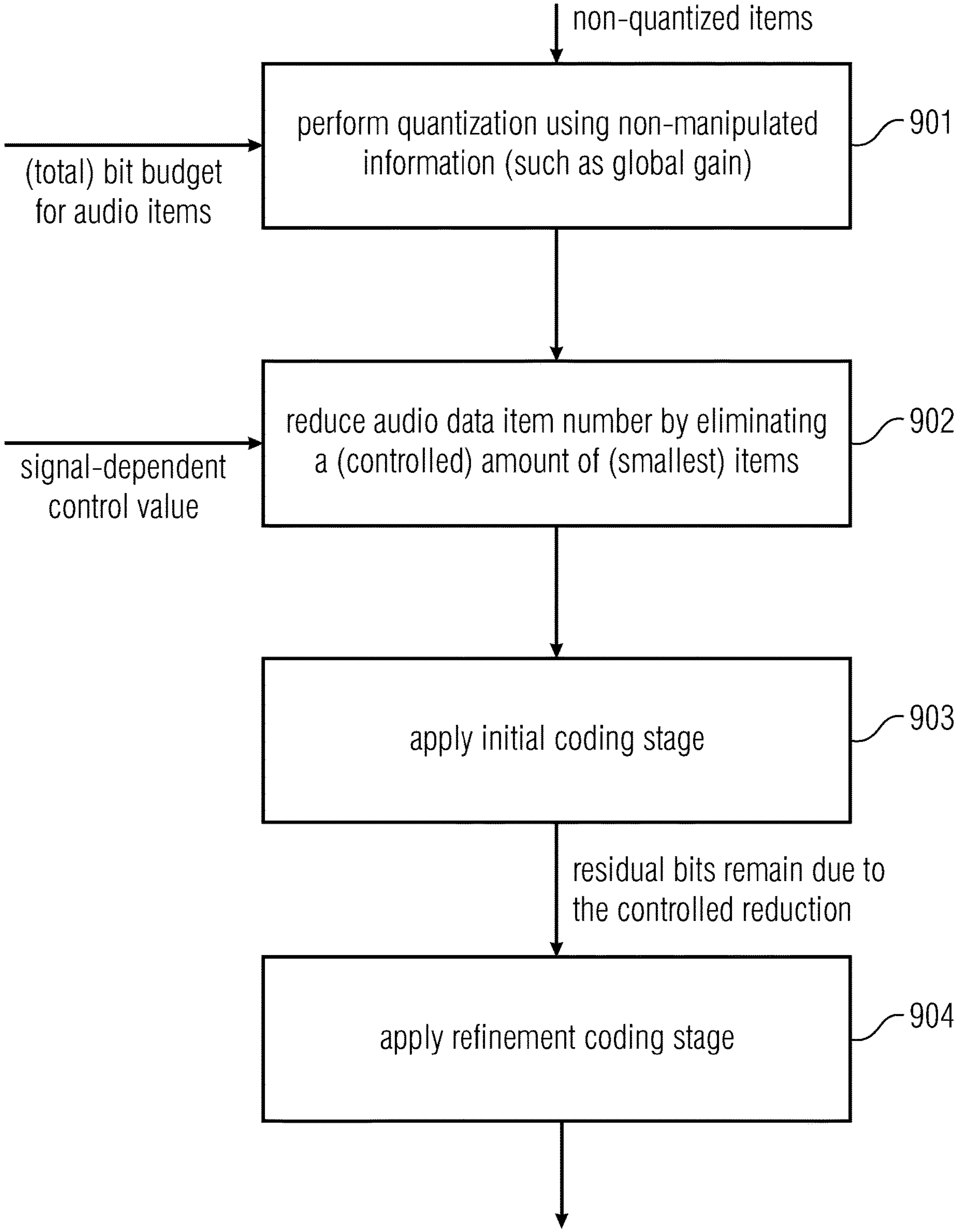
FIG. 12 illustrates an implementation of the separated audio data item reduction.

FIG. 12 illustrates a procedure for reducing the number of audio data items in a signal-dependent way using a separated reduction. In step 901, a quantization is performed using a non-manipulated information such as global gain as calculated from the signal data without any manipulation. To this end, the (total) bit-budget for the audio data items is required and, at the output of block 901, one obtains quantized data items. In block 902, the number of audio data items is reduced by eliminating a (controlled) amount of advantageously the smallest audio data items based on a signal-dependent control value. At the output of block 902, one has obtained a reduced number of data items and, in block 903 the initial coding stage is applied and with the bit-budget for the residual bits that remain due to the controlled reduction, a refinement coding stage is applied as illustrated in 904.

Alternatively to the procedure in FIG. 12, the reduction block 902 can also be performed before the actual quantization using a global gain value or, generally, a certain quantizer step size that has been determined using non-manipulated audio data. This reduction of audio data items can be, therefore, also performed in the non-quantized domain by setting to zero certain advantageously small values or by weighting certain values with weighting factors that, in the end, result in values quantized to zero. In the separated reduction implementation, an explicit quantization step on the one hand and an explicit reduction step on the other hand is performed where the control for the specific quantization is performed without any manipulation of data.

Contrary thereto, FIG. 13 illustrates the integrated reduction mode in accordance with an embodiment of the present invention. In block 911, the manipulated information is determined by the controller 20 such as, for example, the global gain illustrated at the output of block 25 of FIG. 9. In block 912, a quantization of the non-manipulated audio data is performed using the manipulated global gain, or, generally, the manipulated information calculated in block 911. At the output of the quantization procedure of block 912 a reduced number of audio data items is obtained which is initially coded in block 903 and refinement coded in block 904. Due to the signal-dependent reduction of audio data items, residual bits for at least a single full iteration and for at least a portion of a second iteration and advantageously for even more than two iterations remain. A shift of the bit-budget from the initial coding stage to the refinement coding stage is performed in accordance with the present invention and in a signal-dependent way.

The present invention can be implemented at least in four different modes. The determination of the control value can be done in the direct mode with an explicit signal characteristic determination or in an indirect mode without an explicit signal characteristic determination but with the addition of a signal-dependent noise floor to the audio data or to derived audio data as an example for a manipulation. At the same time, the reduction of audio data items is done in an integrated manner or in a separated manner. An indirect determination and an integrated reduction or an indirect generation of the control value and a separated reduction can be performed as well. Additionally, a direct determination together with an integrated reduction and a direct determination of the control value together with a separated reduction can be performed as well. For the purpose of low efficiency, an indirect determination of the control value together with an integrated reduction of audio data items is of advantage.

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

An inventively encoded audio signal can be stored on a digital storage medium or a non-transitory storage medium or can be transmitted on a transmission medium such as a wireless transmission medium or a wired transmission medium such as the Internet. Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. An audio encoder for encoding audio input data, comprising:

a preprocessor for preprocessing the audio input data to acquire audio data to be coded;

a coder processor for coding the audio data to be coded; and a controller for controlling the coder processor so that, depending on a first signal characteristic of a first frame of the audio data to be coded, a number of audio data items of the audio data to be coded by the coder processor for the first frame is reduced compared to a second signal characteristic of a second frame, and a first number of information units used for coding the reduced number of audio data items for the first frame is enhanced compared to a second number of information units for the second frame, wherein the coder processor comprises: a variable quantizer for quantizing the audio data of the first frame to acquire quantized audio data for the first frame and for quantizing the audio data of the second frame to acquire quantized audio data for the second frame; an initial coding stage for coding the quantized audio data of the first frame or the second frame; and a refinement coding stage for encoding residual data of the first frame and the second frame, wherein the controller is configured for analyzing the audio data of the first frame to determine a first control value for the variable quantizer for the first frame, for analyzing the audio data of the second frame to determine a second control value for the variable quantizer for the second frame, the second control value being different from the first control value, and for performing a manipulation of the audio data of the first frame or the second frame or of amplitude-related values derived from the audio data of the first frame or the second frame depending on the audio data for determining the first control value or the second control value, and wherein the variable quantizer is configured to quantize the audio data of the first frame or the second frame without the manipulation, or wherein the first signal characteristic is a first tonality value, wherein the second signal characteristic is a second tonality value, and wherein the first tonality value indicates a higher tonality than the second tonality value, and wherein the controller is configured to reduce the number of audio data items for the first frame to a first number being smaller than the number of audio data items for the second frame, and to increase an average number of information units used for coding each audio data item of the reduced number of audio data items of the first frame to be greater than an average number of information units used for coding each audio data item of the reduced number of audio data items of the second frame, or wherein the coder processor comprises the variable quantizer for quantizing the audio data of the first frame to acquire quantized audio data for the first frame and for quantizing the audio data of the second frame to acquire quantized audio data for the second frame; the initial coding stage for coding the quantized audio data of the first frame or the second frame; the refinement coding stage for encoding residual data of the first frame and the second frame; wherein the controller is configured for analyzing the audio data of the first frame to determine the first control value for the variable quantizer, for the initial coding stage or for an audio data item reducer for the first frame and for analyzing the audio data of the second frame to determine the second control value for the variable quantizer, for the initial coding stage or for an audio data item reducer for the second frame, the second control value being different from the first control value, and for determining a first tonality characteristic as the first signal characteristic to determine the first control value, and a second tonality characteristic as the second signal characteristic to determine the second control value so that a bit-budget for the refinement coding stage is increased in case of the first tonality characteristic compared to the bit-budget for the refinement coding stage in case of the second tonality characteristic, wherein the first tonality characteristic indicates a greater tonality then the second tonality characteristic, or wherein the coder processor comprises the initial coding stage and the refinement coding stage, wherein the controller is configured to reduce the number of audio data items encoded by the initial coding stage for the first frame, wherein the initial coding stage is configured to code the reduced number of audio data items for the first frame using a first frame initial number of information units, and wherein the refinement coding stage is configured to use a first frame remaining number of information units for a refinement coding for the reduced number of audio data items for the first frame, wherein the first frame initial number of information units added to the first frame remaining number of information units results in a predetermined number of information units for the first frame, wherein the controller is configured to reduce the number of audio data items encoded by the initial coding stage for the second frame to a higher number of audio data items compared to the first frame, wherein the initial coding stage is configured to code the reduced number of audio data items for the second frame using a second frame initial number of information units, the second frame initial number of information units being higher than the first frame initial number of information units, and wherein the refinement coding stage is configured to use a second frame remaining number of information units for a refinement coding for the reduced number of audio data items for the second frame, wherein the second frame initial number of information units added to the second frame remaining number of information units results in the predetermined number of information units for the first frame.

2. The audio encoder of claim 1, wherein the coder processor comprises the initial coding stage and the refinement coding stage, wherein the initial coding stage is configured to code the reduced number of audio data items for the first frame using a first frame initial number of information units, wherein the refinement coding stage is configured to use a first frame remaining number of information units for a refinement coding for the reduced number of audio data items for the first frame, wherein the first frame initial number of information units added to the first frame remaining number of information units result in a predetermined number of information units for the first frame, and wherein the controller is configured to control the coder processor so that the refinement coding stage performs a refinement coding of at least one of the reduced number of audio data items of the first frame using at least two information units, or so that the refinement coding stage performs a refinement coding of more than 50 percents of the reduced number of audio data items using at least two information units for each audio data item, or wherein the controller is configured to control the coder processor so that the refinement coding stage performs a refinement coding of all audio data items of the second frame using less than two information units, or so that the refinement coding stage performs a refinement coding of less than 50 percents of the reduced number of audio data items using at least two information units for each audio data item.

3. The audio encoder of claim 1, wherein the coder processor comprises the initial coding stage and the refinement coding stage, wherein the initial coding stage is configured to code the reduced number of audio data items for the first frame using a first frame initial number of information units, wherein the refinement coding stage is configured to use a first frame remaining number of information units for a refinement coding for the reduced number of audio data items for the first frame, wherein the refinement coding stage is configured to iteratively assign the first frame remaining number of information units to the reduced number of audio data items in at least two sequentially performed iterations, to calculate values of the assigned information units for the at least two sequentially performed iterations and to introduce the calculated values of the information units for the at least two sequentially performed iterations into an encoded output frame in a predetermined order.

4. The audio encoder of claim 3, wherein the refinement coding stage is configured to sequentially calculate an information unit for each audio data item of the reduced number of audio data items for the first frame in an order from a low frequency information for the audio data item to a high frequency information for the audio data item in a first iteration, wherein the refinement coding stage is configured to sequentially calculate an information unit for each audio data item of the reduced number of audio data items for the first frame in an order from a low frequency information for the audio data item to a high frequency information for the audio data item in a second iteration, and wherein the refinement coding stage is configured to check, whether a number of already assigned information units is lower than a predetermined number of information units for the first frame less than the first frame initial number of information units and to stop the second iteration in case of a negative check result, or in case of a positive check result, to perform a number of further iterations, until a negative check result is acquired, the number of further iterations being at least one, or wherein the refinement coding stage is configured to count a number of non-zero audio items, and to determine the number of iterations from the number of non-zero audio items and a predetermined number of information units for the first frame less than the first frame initial number of information units.

5. The audio encoder of claim 1, wherein the coder processor comprises the initial coding stage and the refinement coding stage, wherein the initial coding stage is configured to code a number of most significant information units for each audio data item of the reduced number of audio data items for the first frame using a first frame initial number of information units, the number being greater than one, and wherein the refinement coding stage is configured to use a first frame remaining number of information units for encoding a number of least significant information units for each audio data item of the reduced number of audio data items for the first frame, the number being greater than one for at least one audio data item of the reduced number of audio data items for the first frame.

6. The audio encoder of claim 1, wherein the initial coding stage is an entropy coding stage for entropy coding, or the refinement coding stage is a residual or binary coding stage for encoding residual data of the first frame and the second frame.

7. The audio encoder of claim 1, wherein the controller is configured to determine the first or second control value so that a first budget of information units for the initial coding stage is lower than or equal to a predefined value, and wherein the controller is configured to derive a second budget of information units for the refinement coding stage using the first budget of information units and the maximum number of information units for the first or second frame or the predefined value.

8. The audio encoder of claim 1, wherein the controller is configured to calculate the amplitude-related values as a plurality of power values derived from one or more audio values of the audio data and to manipulate the power values using an addition of an identical manipulation value to all power values of the plurality of power values, or wherein the controller is configured to randomly add or subtract an identical manipulation value to or from all audio values of a plurality of audio values comprised in the frame, or, to add or subtract values acquired by the same magnitude of the manipulation value but advantageously with randomized signs, or to add or subtract values acquired by a subtraction of slightly different terms from the same magnitude to add or subtract values acquired as samples from a normalized probability distribution scaled using the calculated complex or real magnitude of the manipulation value, or wherein the controller is configured to calculate the amplitude-related values using an exponentiation of the audio data of the first or second frame or of downsampled audio data of the first or second frame with an exponent value, the exponent value being greater than 1.

9. The audio encoder of claim 1, wherein the controller is configured to calculate a manipulation value for the manipulation using a maximum value of the plurality of audio data or of the amplitude-related values or using a maximum value of a plurality of downsampled audio data or a plurality of downsampled amplitude-related values for the first or second frame.

10. The audio encoder of claim 1, wherein the controller is configured to calculate a manipulation value for the manipulation additionally using a signal independent weighting value, the signal independent weighting value depending on at least one of a bit-rate for the first or second frame, a frame duration, and a sampling frequency.

11. The audio encoder of claim 1, wherein the controller is configured to calculate a manipulation value for the manipulation using a signal dependent weighting value derived from at least one of a first sum of magnitudes of the audio data or downsampled audio data within the frame, a second sum of magnitudes of the audio data or the downsampled audio data within the frame multiplied by an index associated with each magnitude, and a quotient of the second sum and the first sum.

12. The audio encoder of claim 1, wherein the controller is configured to calculate the manipulation value for the manipulation based on the following equation:

$$N(X_f) = \max_k |X_f(k)| * 2^{-regBits-lowBits}$$

wherein k is a frequency index, wherein $X_f(k)$ is an audio data value for the frequency index k before quantization, wherein max is the maximum function, wherein regBits is a first signal independent weighting value, and wherein lowBits is a second signal dependent weighting value.

13. The audio encoder of claim 1, wherein the preprocessor further comprises:

a time-frequency converter for converting time domain audio data into spectral values of the frame; and a spectral processor for calculating modified spectral values comprising a spectral envelope being flatter than a spectral envelope of the spectral values, wherein the modified spectral values represent the audio data of the first or the second frame to be encoded by the coder processor.

14. The audio encoder of claim 13, wherein the spectral processor is configured to perform at least one of a temporal noise shaping operation, a spectral noise shaping operation, and a spectral whitening operation.

15. The audio encoder of claim 1, wherein the controller is configured to calculate the control value using a plurality of energy values as the amplitude related values for the frame, wherein each energy value is derived from a power value as an amplitude related value and a signal-dependent manipulation value for the manipulation.

16. The audio encoder of claim 15, wherein the controller is configured to calculate a required bit estimate of each energy value depending on the energy value and a candidate value for the control value, to accumulate the required bit estimates for the energy values and the candidate value for the control value, to check, whether an accumulated bit estimate for the candidate value for the control value fulfills an allowed bit consumption criterion, and to modify the candidate value for the control value in case the allowed bit consumption criterion is not fulfilled and to repeat the calculation of the required bit estimate, the accumulation of the required bit rate and the checking until a fulfillment of the allowed bit consumption criterion for a modified candidate value for the control value is found.

17. The audio encoder of claim 15, wherein the controller is configured to calculate the plurality of energy values based on the following equation:

$$E(k)=10\ \log_{10}(PX_{lp}(k)+N(X_f)+2^{-31}),$$

wherein E(k) is an energy value for an index k, wherein $PX_{lp}(k)$ is a power value for an index k as the amplitude related value, and wherein $N(X_f)$ is the signal dependent manipulation value.

18. The audio encoder of claim 1, wherein the controller is configured to calculate the first or second control value based on an estimation of accumulated information units required for each manipulated audio data value or manipulated amplitude-related value.

19. The audio encoder of claim 1, wherein the controller is configured to manipulate in such a way that due to the manipulation, a bit-budget for the initial coding stage is increased or a bit-budget for the refinement coding stage is decreased.

20. The audio encoder of claim 1, wherein the controller is configured to manipulate in such a way that a manipulation results in a higher bit-budget of the residual coding stage for a signal with a first tonality compared to a signal with a second tonality, wherein the second tonality is lower than the first tonality.

21. The audio encoder of claim 1, wherein the controller is configured to manipulate in such a way that an energy of the audio data, from which a bit-budget for the initial coding stage is calculated, is increased with respect to the energy of the audio data to be quantized by the variable quantizer.

22. The audio encoder of claim 1, wherein the coder processor comprises the variable quantizer for quantizing the audio data of the first frame to acquire quantized audio data for the first frame and for quantizing the audio data of the second frame to acquire quantized audio data for the second frame, wherein the controller is configured to calculate a global gain for the first frame or for the second frame, and wherein the variable quantizer comprises: a weighter for weighting the audio data of the first frame and the audio data of the second frame with the global gain; and a quantizer core comprising a fixed quantization step size, wherein the quantizer core is configured for quantizing an output of the weighter with the fixed quantization step size.

23. The audio encoder of claim 1, wherein the coder processor comprises an initial coding stage and a refinement coding stage, wherein the refinement coding stage is configured for calculating refinement bits for quantized audio values in a plurality of iterations, wherein, in each iteration, a refinement bit indicates a different amount, or wherein a refinement bit in a lower iteration indicates a higher amount than a refinement bit in a higher iteration, or wherein the amount is a fractional amount being a fraction of a quantizer step size indicated by the control value.

24. The audio encoder of claim 1, wherein the coder processor comprises a refinement coding stage, wherein the refinement coding stage is configured to perform an iterative processing comprising at least two iterations, to check, whether a quantized audio value or the quantized audio value together with a potential first amount associated with a refinement bit for the quantized audio value in a first iteration, added to or subtracted from a second amount for the second iteration when weighted by a global gain is greater than or lower than a non-quantized audio value, and to set a refinement bit for the second iteration depending on a result of the check.

25. The audio encoder of claim 1, wherein the coder processor comprises a variable quantizer and a refinement coding stage, wherein the refinement coding stage is configured to calculate a refinement bit only for audio values that are not quantized to zero by the variable quantizer.

26. The audio encoder of claim 1, wherein the controller is configured to reduce an impact of a manipulation for the audio data comprising a center of mass at a lower frequency, and wherein an initial coding stage of the coder processor is configured to remove high frequency spectral values from the audio data in case it is determined that a bit-budget for the first or the second frame does not suffice for encoding the quantized audio data of the frame.

27. The audio encoder of claim 1, wherein the controller is configured to perform a bisection search for each frame individually using manipulated spectral energy values for the first or the second frame as manipulated amplitude-related values for the first or the second frame.

28. A method of encoding audio input data, comprising:

preprocessing the audio input data to acquire audio data to be coded;

coding the audio data to be coded; and controlling the coding so that, depending on a first signal characteristic of a first frame of the audio data to be coded, a number of audio data items of the audio data to be coded for the first frame is reduced compared to a second signal characteristic of a second frame, and a first number of information units used for coding the reduced number of audio data items for the first frame is enhanced compared to a second number of information units for the second frame, wherein the coding comprises: variably quantizing audio data of a frame to acquire quantized audio data; entropy coding the quantized audio data of the frame; and encoding residual data of the frame; wherein the controlling comprises determining a control value for the variably quantizing, the determining comprising: analyzing the audio data of the first or the second frame; and performing a manipulation of the audio data of the first or the second frame or amplitude-related values derived from the audio data of the first or the second frame depending on the audio data for determining the control value, wherein the variably quantizing quantizes the audio data of the frame without the manipulation, or wherein the controlling comprises determining a first or second tonality characteristic of the audio data and determining the control value so that a bit-budget for the residual coding is increased in case of the first tonality characteristic compared to the bit-budget for the residual coding stage in case of the second tonality characteristic, wherein the first tonality characteristic indicates a greater tonality then the second tonality characteristic, or wherein the coding comprises variably quantizing the audio data of the first frame to acquire quantized audio data for the first frame and quantizing the audio data of the second frame to acquire quantized audio data for the second frame; initially coding the quantized audio data of the first frame or the second frame; refinement encoding residual data of the first frame and the second frame; wherein the controlling comprises analyzing the audio data of the first frame to determine a first control value for the variable quantizer, for the initial coding stage or for an audio data item reducer for the first frame and for analyzing the audio data of the second frame to determine a second control value for the variably quantizing, for the initial coding or for an audio data item reducing for the second frame, the second control value being different from the first control value, and determining the first tonality characteristic as the first signal characteristic to determine the first control value, and the second tonality characteristic as the second signal characteristic to determine the second control value so that a bit-budget for the refinement coding is increased in case of the first tonality characteristic compared to the bit-budget for the refinement coding stage in case of the second tonality characteristic, wherein the first tonality characteristic indicates a greater tonality then the second tonality characteristic, or wherein the coding comprises the initial coding and the refinement coding, wherein the controlling comprises reducing the number of audio data items encoded by the initial coding for the first frame, wherein the initial coding codes the reduced number of audio data items for the first frame using a first frame initial number of information units, and wherein the refinement coding to uses a first frame remaining number of information units for the refinement coding for the reduced number of audio data items for the first frame, wherein the first frame initial number of information units added to the first frame remaining number of information units results in a predetermined number of information units for the first frame, wherein the controlling comprises reducing the number of audio data items encoded by the initial coding for the second frame to a higher number of audio data items compared to the first frame, wherein the initial coding codes the reduced number of audio data items for the second frame using a second frame initial number of information units, the second frame initial number of information units being higher than the first frame initial number of information units, and wherein the refinement coding uses a second frame remaining number of information units for the refinement coding for the reduced number of audio data items for the second frame, wherein the second frame initial number of information units added to the second frame remaining number of information units results in the predetermined number of information units for the first frame.

29. A non-transitory digital storage medium having stored thereon a computer program for performing, when said computer program is run by a computer, a method of encoding audio input data, the method comprising:

preprocessing the audio input data to acquire audio data to be coded;

coding the audio data to be coded; and controlling the coding so that, depending on a first signal characteristic of a first frame of the audio data to be coded, a number of audio data items of the audio data to be coded for the first frame is reduced compared to a second signal characteristic of a second frame, and a first number of information units used for coding the reduced number of audio data items for the first frame is enhanced compared to a second number of information units for the second frame, wherein the coding comprises: variably quantizing audio data of a frame to acquire quantized audio data; entropy coding the quantized audio data of the frame; and encoding residual data of the frame; wherein the controlling comprises determining a control value for the variably quantizing, the determining comprising: analyzing the audio data of the first or the second frame; and performing a manipulation of the audio data of the first or the second frame or amplitude-related values derived from the audio data of the first or the second frame depending on the audio data for determining the control value, wherein the variably quantizing quantizes the audio data of the frame without the manipulation, or wherein the controlling comprises determining a first or second tonality characteristic of the audio data and determining the control value so that a bit-budget for the residual coding is increased in case of the first tonality characteristic compared to the bit-budget for the residual coding stage in case of the second tonality characteristic, wherein the first tonality characteristic indicates a greater tonality then the second tonality characteristic, or wherein the coding comprises variably quantizing the audio data of the first frame to acquire quantized audio data for the first frame and quantizing the audio data of the second frame to acquire quantized audio data for the second frame; initially coding the quantized audio data of the first frame or the second frame; refinement encoding residual data of the first frame and the second frame; wherein the controlling comprises analyzing the audio data of the first frame to determine a first control value for the variable quantizer, for the initial coding stage or for an audio data item reducer for the first frame and for analyzing the audio data of the second frame to determine a second control value for the variably quantizing, for the initial coding or for an audio data item reducing for the second frame, the second control value being different from the first control value, and determining the first tonality characteristic as the first signal characteristic to determine the first control value, and the second tonality characteristic as the second signal characteristic to determine the second control value so that a bit-budget for the refinement coding is increased in case of the first tonality characteristic compared to the bit-budget for the refinement coding stage in case of the second tonality characteristic, wherein the first tonality characteristic indicates a greater tonality then the second tonality characteristic, or wherein the coding comprises the initial coding and the refinement coding, wherein the controlling comprises reducing the number of audio data items encoded by the initial coding for the first frame, wherein the initial coding codes the reduced number of audio data items for the first frame using a first frame initial number of information units, and wherein the refinement coding to uses a first frame remaining number of information units for the refinement coding for the reduced number of audio data items for the first frame, wherein the first frame initial number of information units added to the first frame remaining number of information units results in a predetermined number of information units for the first frame, wherein the controlling comprises reducing the number of audio data items encoded by the initial coding for the second frame to a higher number of audio data items compared to the first frame, wherein the initial coding codes the reduced number of audio data items for the second frame using a second frame initial number of information units, the second frame initial number of information units being higher than the first frame initial number of information units, and wherein the refinement coding uses a second frame remaining number of information units for the refinement coding for the reduced number of audio data items for the second frame, wherein the second frame initial number of information units added to the second frame remaining number of information units results in the predetermined number of information units for the first frame.

* * * * *